United States Patent [19]
O'Sullivan

[11] Patent Number: 5,640,444
[45] Date of Patent: *Jun. 17, 1997

[54] METHODS AND APPARATUS FOR CONTROLLING DATA TRANSMISSION USING RADIO DEVICES

[75] Inventor: Harry M. O'Sullivan, Red Oak, Tex.

[73] Assignee: Spectrum Information Technologies, Inc., Purchase, N.Y.

[*] Notice: The term of this patent shall not extend beyond the expiration date of Pat. No. 5,127,041.

[21] Appl. No.: 316,724

[22] Filed: Oct. 3, 1994

Related U.S. Application Data

[62] Division of Ser. No. 178,474, Jan. 6, 1994, Pat. No. 5,353,334, which is a continuation of Ser. No. 866,879, Apr. 10, 1992, abandoned, which is a division of Ser. No. 531,762, Jun. 1, 1990, Pat. No. 5,127,041.

[51] Int. Cl.$^6$ .................................................. H04Q 7/38
[52] U.S. Cl. .............................. 379/59; 379/63; 379/98
[58] Field of Search .............................. 379/58–60, 63, 379/93, 96, 97, 98, 99, 100, 281, 339, 353, 443, 444; 455/33.1, 88

[56] References Cited

U.S. PATENT DOCUMENTS

| | | |
|---|---|---|
| Re. 34,034 | 8/1992 | O'Sullivan . |
| 3,367,563 | 2/1968 | Sainton . |
| 3,613,004 | 10/1971 | Wycoff . |

(List continued on next page.)

FOREIGN PATENT DOCUMENTS

| | | |
|---|---|---|
| 0295146 | 6/1988 | European Pat. Off. . |
| 0309627 | 4/1989 | European Pat. Off. . |
| 3433900 | 3/1986 | Germany . |

(List continued on next page.)

OTHER PUBLICATIONS

® 1366435 Oct. 22, 1995.
"A Tale Of Two Modems", F.R. Derfler, Jr., Aug. 21, 1984, PC Magazine.

(List continued on next page.)

*Primary Examiner*—Dwayne D. Bost
*Attorney, Agent, or Firm*—Sixbey, Friedman, Leedom & Ferguson, PC; Charles M. Leedom, Jr.; Evan R. Smith

[57] ABSTRACT

A system for connecting a computer to both cellular and landline telephone systems is disclosed. A cellular modem has a single RJ-11 jack for interfacing either to a landline jack or to a signal processing cable connected to a cellular transceiver. The analog data transmission signals of the modem, which are compatible with landline "tip" and "ring" lines, are provided on the third and fourth pins of the RJ-11 connector. When the modem is to be used as a landline modem, the RJ-11 connector is connected directly to a standard landline telephone jack using an ordinary modular telephone wire. When used with a cellular transceiver, the modem generates transceiver operation commands according to a predefined generic command language which is not specific to a particular transceiver. The generic commands are transmitted in serial digital form on the fifth terminal of the RJ-11 connector. The signal processing cable acknowledges the commands received via a serial digital signal transmitted to the second terminal of the RJ-11 connector. The signal processing cable then transmits control signals to the transceiver, with the signals being appropriate to the type of cellular transceiver used, to produce the function requested by the modem's universal command.

37 Claims, 13 Drawing Sheets

Microfiche Appendix Included
(1 Microfiche, 33 Pages)

U.S. PATENT DOCUMENTS

| | | |
|---|---|---|
| 3,657,700 | 4/1972 | Lutzker . |
| 3,674,935 | 7/1972 | Lawrence . |
| 3,711,777 | 1/1973 | Tink . |
| 3,714,586 | 1/1973 | Mason . |
| 3,714,650 | 1/1973 | Fuller et al. . |
| 3,745,251 | 7/1973 | Fretwell . |
| 3,766,479 | 10/1973 | Thalimer et al. . |
| 3,851,112 | 11/1974 | Kusan . |
| 3,878,333 | 4/1975 | Shimizu et al. . |
| 3,899,772 | 8/1975 | Mead et al. . |
| 3,927,259 | 12/1975 | Brown . |
| 3,939,431 | 2/1976 | Cohlman . |
| 3,974,343 | 8/1976 | Cheney . |
| 4,012,596 | 3/1977 | West, Jr. et al. . |
| 4,025,853 | 5/1977 | Addeo . |
| 4,094,484 | 6/1978 | Galione . |
| 4,109,283 | 8/1978 | Rast . |
| 4,178,476 | 12/1979 | Frost . |
| 4,284,849 | 8/1981 | Anderson et al. . |
| 4,330,862 | 5/1982 | Smolik . |
| 4,337,376 | 6/1982 | Gruenberg . |
| 4,376,310 | 3/1983 | Stackhouse et al. . |
| 4,403,322 | 9/1983 | Kato et al. . |
| 4,414,661 | 11/1983 | Karlstrom . |
| 4,415,774 | 11/1983 | Driver . |
| 4,419,756 | 12/1983 | Cheng-Quispe et al. . |
| 4,425,665 | 1/1984 | Stauffer . |
| 4,434,461 | 2/1984 | Puhl . |
| 4,486,624 | 12/1984 | Puhl . |
| 4,488,002 | 12/1984 | Seibel . |
| 4,498,173 | 2/1985 | Reudink . |
| 4,503,288 | 3/1985 | Kessler . |
| 4,519,068 | 5/1985 | Krebs et al. . |
| 4,524,244 | 6/1985 | Faggin et al. . |
| 4,525,861 | 7/1985 | Freeburg . |
| 4,545,071 | 10/1985 | Freeburg . |
| 4,549,308 | 10/1985 | LoPinto . |
| 4,556,760 | 12/1985 | Goldman . |
| 4,558,178 | 12/1985 | Yasuda et al. . |
| 4,562,572 | 12/1985 | Goldman et al. . |
| 4,568,800 | 2/1986 | Orikasa . |
| 4,577,182 | 3/1986 | Millsap et al. . |
| 4,578,537 | 3/1986 | Faggin et al. . |
| 4,578,796 | 3/1986 | Charalambous et al. . |
| 4,591,661 | 5/1986 | Benedetto et al. . |
| 4,637,022 | 1/1987 | Burke et al. . |
| 4,654,867 | 3/1987 | Labedz et al. . |
| 4,656,318 | 4/1987 | Noyes . |
| 4,658,096 | 4/1987 | West, Jr. et al. . |
| 4,660,218 | 4/1987 | Hashimoto . |
| 4,661,659 | 4/1987 | Nishimura . |
| 4,667,653 | 5/1987 | Cornell . |
| 4,677,656 | 6/1987 | Burke et al. . |
| 4,680,787 | 7/1987 | Marry . |
| 4,685,123 | 8/1987 | Hsia . |
| 4,691,314 | 9/1987 | Bergins et al. . |
| 4,694,473 | 9/1987 | Etoh . |
| 4,697,281 | 9/1987 | O'Sullivan . |
| 4,698,839 | 10/1987 | DeVaney et al. . |
| 4,718,080 | 1/1988 | Serrano et al. . |
| 4,737,975 | 4/1988 | Shaffer . |
| 4,751,725 | 6/1988 | Bonta et al. . |
| 4,752,949 | 6/1988 | Steinbeck et al. . |
| 4,759,059 | 7/1988 | Christensen . |
| 4,775,997 | 10/1988 | West, Jr. et al. . |
| 4,823,362 | 4/1989 | Etoh . |
| 4,823,373 | 4/1989 | Takahashi et al. . |
| 4,837,800 | 6/1989 | Freeburg et al. . |
| 4,837,812 | 6/1989 | Takahashi et al. . |
| 4,852,146 | 7/1989 | Hathcock et al. . |
| 4,868,859 | 9/1989 | Sheffer . |
| 4,868,863 | 9/1989 | Hartley et al. . |
| 4,887,290 | 12/1989 | Dop et al. . |
| 4,890,315 | 12/1989 | Bendixen et al. . |
| 4,912,756 | 3/1990 | Hop . |
| 4,922,517 | 5/1990 | West, Jr. . |
| 4,955,083 | 9/1990 | Phillips et al. . |
| 4,972,457 | 11/1990 | O'Sullivan . |
| 4,972,462 | 11/1990 | Shibata . |
| 4,991,197 | 2/1991 | Morris . |
| 5,025,254 | 6/1991 | Hess . |
| 5,046,082 | 9/1991 | Zicker et al. . |
| 5,073,921 | 12/1991 | Nomura et al. . |
| 5,081,673 | 1/1992 | Engelke et al. . |
| 5,095,534 | 3/1992 | Hiyama . |
| 5,127,041 | 6/1992 | O'Sullivan . |
| 5,131,019 | 7/1992 | Sheffer et al. . |
| 5,134,648 | 7/1992 | Hochfield et al. . |
| 5,170,470 | 12/1992 | Pindar et al. . |
| 5,202,963 | 4/1993 | Zelley . |
| 5,249,218 | 9/1993 | Sainton . |
| 5,353,334 | 10/1994 | O'Sullivan . |

FOREIGN PATENT DOCUMENTS

| | | |
|---|---|---|
| 2170977 | 2/1986 | United Kingdom . |
| 2256113 | 11/1992 | United Kingdom . |
| 0000718 | 1/1987 | WIPO . |
| 0004362 | 12/1988 | WIPO . |
| 0005553 | 6/1989 | WIPO . |
| 0003076 | 3/1990 | WIPO . |
| 0007044 | 5/1991 | WIPO . |
| 0010047 | 6/1992 | WIPO . |

OTHER PUBLICATIONS

"Advanced Mobile PhoneService: Control Architecture", Z.C. Fluhr & P.T. Porter, Bell System Technical Jouranl, vol. 58, No. 1, Jan. 1979.

"Advanced Mobile Phone Serivce: A Subscriber Set For The Equipment Test," R.E. Fisher, Bell System Technical Jouranl, vol. 58, No. 1, Jan. 1979.

"Advanced Mobile PhoneService," F.H. Blecher, IEEE Transactions on Vehicular Technology, VT 29, No. 2, May 1980.

"An 800Mhz Approach to Underground Data Communications," T.M. Caridi and P. Mighdoll, IEEE 1981 Industry Applications.

"ARQ Schemes for Data Transmission in Mobile Radio Systems," R.A. Comroe and J. Costello, Jr., IEEE Transactions on Vehicular Technology, vol. VT–33, Aug. 1984.

"AT&T 208A Data Set Product," Jul. 1975, Circuit Description, DC–1D232–01.

AT&T's Dimension PBX described in AT&T publication Bell System Practice Section 503–100–103, Issue 3, published Mar. 1981, which relates to a multi–button electronic telephone set.

Barker and Nadeau, Byte, Oct. 1985, p. 396, "Modem for Cellular Phones".

Bell Bruno, Personal Computing, Jun. 1989, p. 40, "Excuse me your laptop is ringing . . . ".

Bush, Data Communication, Oct. 1986, p. 74, "Firms finding solutions to problems of data via cellular radio".

"Celldata Launched", British Telecom Journal, No. 3 (1985), vol. 6, Autumn.

"Cellnet Adds Data To Cellular Service," International News Telepone Engineer and Management, Nov. 1, 1985.

"Cellular Link is Step to Portable Office," Electronic, Jun. 28, 1984, pp. 48 and 50.

COMPAQ, "SpeedPAQ 144 Modem—Reference Guide" ©1992.
COMPAQ, "COMPAQ Product Quality Statements" ©1992.
COMPAQ, "SpeedPAQ 144 Modem—COMPAQ Portable Computers Installation Guide" ©1992.
COMPAQ, "A COMPAQ and 121/PT128 Data Application . . .", dated Jan. 25, 1993.
COMPAQ, "SpeedPAQ 144 Modem—Quick Reference" ©1992.
COMPAQ, "SpeedPAQ 144 Modem—About Your Fax Software . . ." ©1992.
Computer & Software News, Nov. 14, 1988, "Omnitel bows v. 32 9600 bps modem . . .".
Computerworld, Apr. 25, 1988, p. 60, "'EDI Yellow Pages' goes to press".
"Dialing Data Via Mobile Telephone", Ira Brodsky, pp. 103–110, Data Communications International, Oct. 1989.
"Data Signaling Functions for a Cellular Mobile Telephone System," V. Hachenburg, B.D. Holm, and J.I. Smith, IEEE Transactions on Vehicular Technology, vol. VT 26, No. 1, Feb. 1977.
"Data Transmissions Over VHF and UHF Land Mobile Radio Channels," P.J. Cadman and R.L. Brewster, IEEE Proceedings vol. 130, Part F, No. 6, Oct. 1983.
"Data Transmission for Mobile Radio," T. Brenig, IEEE Transactions on Vehicular Technology, VT–27 No. 3, Aug. 1978.
Day, PC Computing, Jul. 1989, p. 108, "Letters from the road: around the world with a laptop . . .".
Dryden, Infoworld, Feb. 19, 1990, p. 31, "PCs Phone Home: Cellular, Radio Links . . .".
Dryden, Infoworld, Jun. 18, 1990, p. 37, "Toshiba Signals Move to Cellular Communication . . .".
Excerpt from "Digital Fundamental", 3rd edition, by Thomas L. Floyd, Copyright 1986; pp. 562–569.
Supplementary European Search Report dated Feb. 3, 1995.
"Firm Unveils Cellular Bridge," Bartimo, InfoWorld, vol. 6, Issue 27, pp. 5, 11, and 12, Jul. 2, 1984.
Galuszka, Data Communications, Jul., 1985, p. 68, "With a grip on 'handoff' woes, cellular radio grasps . . .".
Godin, Electronic, Sep. 22, 1983, p. 121 et seq., "The cellular telephone goes on line".
Hayes Smartmodem Owner's Manual, Hayes Microcomputer Products, Inc. 1981.
Hindin, PC Week, Jun. 28, 1988, "Cellular laptop phones? Maybe; . . .".
Hindin, PC Week, Nov. 10, 1987, p. c3, "Speed, low prices featured in new modem offerings . . .".
Hurwood, Computer & Communications Decisions, Apr. 9, 1985, p. 134, "Do your Modems measure up?. . .".
Howe, Data Communications, Dec. 1982, p. 141, "Industry watches as AT&T is unleashed . . .".
Infoworld, Oct. 12, 1987, p. 8, "Several Exhibitors Offer Glimpse of What to Expect at Comdex".
Information received from Nokia on Jan. 25, 1993, "Why the Nokia 121 Strikes A Cord With Business People".
Kramer, PC Week, Nov. 13, 1989, p. 100, "Advances freeing communicators on the go; . . .".
Kramer, PC Week, Sep. 17, 1990, p. 129, "Cellular modems in need of industry standard; . . .".
Kramer, PC Week, Sep. 17, 1990, p. 133, "Vendors compete to establish cellular standard; . . .".
Kramer, PC Week, Dec. 11, 1989, p. 43.

Lilly, PC Week, Jan. 7, 1986, p. 132, "Cellular modems show wide promise, narrow use".
Lilly, PC Week, Jan. 7, 1986, p. 135, "Cellular modems can transmit data anywhere".
Lineback Electronics Report, Jun. 28, 1984, p. 48, "Cellular link is step to portable office".
"Low Bit–Rate Speech Coders Applicable in Mobile Satellite Communications Systems," Neviano DAL Degan and Fulvio Russina Cselt–13 Centrol Studi e Laboratori Telecommunicazioni S.p.A. via G. Reiss Romoli, 274–10148, Torino Italy.
Mier, Data Communications, Sep. 1982, p. 40, "Tuning into cellular radio".
"Millicom Cellular Portable Telephone," Technical Disclosure, Nov. 1984, pp. 1.5, 2.6, 2.18–2.21, 6.11–6.13.
Mobile Data Report, Nov. 19, 1990, v. 3, No. 5, p. 1–4, "Borland's Sidekick 2.0 . . .".
Mobile Data Report, Oct. 22, 1990, pp. 4–5, "NEC Introduces Laptop, Phone, RJ–11 Briefcase".
Morrison & Dempsey Communications, "AB3X Cellular Interface," owner's manual, Nov. 1987.
Network World, Apr. 18, 1988, p. 15.
O'Malley, Personal Computing, Jun. 29, 1990, p. 106, "The well connected laptop; . . .".
O'Malley, Mobile Office, Nov. 1990, pp. 44–50, "The Laptop to Cellular Connection".
"Optimal Blocklengths for ARQ Error Control Schemes," Joel M. Morris, IEEE Transactions on Communications, vol. COM–27, No. 2, Feb. 1979.
Overview of AMPS Mobile Call Processing System, Robert M. Fuller and Fred A. Epler, 1980 Annual Conference of the IEEE Vehicular Technology Society.
Ozanich, Computerworld on Communications, Jan. 18, 1984, p. 15 et seq., "Trafficking in cellular radio technology".
Panasonic's "Easa–Phone" system described in Technical Guide KX–T 30810 for Panasonic's electronic modular switching system; and KK– T 30830 for its associated telepone station.
"Portable Computer and Host Talk Over Radio–Frequency Link," Electronic, vol. 56, Aug. 25, 1983, J. Krebs.
PC Week, Jul. 16, 1985, p. 37, "Why Lap–top PC users need a cellular assist".
"Quality of Service and Bandwidth Efficiency of Cellular Mobile Radio with Variable Bit–Rate Speech Transmission," D.J. Goodman and C.E.W. Sundberg, IEEE Transactions on Vehicular Technology, vol. VT–32, No. 3, Aug. 1983.
Reiter, Network World, Oct. 26, 1987, p. 31, "How ya gonna call? . . .".
Reiter and Thompson, PC Magazine, Dec. 25, 1990, pp. 365–382, "Data on the go: Three Cellular Modems".
Schneiderman, ComputerWorld, May 5, 1986, p. 17, "AT&T rides accelerating mobile data communications market".
Rosenthal, PC Week, Mar. 18, 1986, p. s51, "Radio modems meet the need for true portability . . .".
Spectrum Information Technologies, Inc. et al. v. Data Race, Inc.—Affidavit of Peter Caserta.
Spectrum Information Technologies, Inc. et al. v. Data Race, Inc.—Affidavit of John Rule.
Spectrum Information Technologies, Inc. et al. v. Data Race, Inc.—Affidavit of Evan R. Smith.
Spectrum Information Technologies, Inc. et al. v. Data Race, Inc.—Amended Answer.

Spectrum Information Technologies, Inc. et al. v. Data Race, Inc.—Amended Complaint.
Spectrum Information Technologies, Inc. et al. v. Data Race, Inc.—Memo in Support Of Plaintiff's Application for Temporary Restraining Order.
Spectrum Information Technologies, Inc. et al. v. Data Race, Inc.—Response to Plaintiff's Application for Temporary Restraining Order.
Spectrum Information Technologies, Inc. et al. v. Data Race, Inc.—Transcript of Proceedings.
Spectrum Information Technologies, Inc. et al. v. Data Race, Inc.—Original Answer and Counterclaims.
Spectrum Information Technologies, Inc. et al. v. Microcom, Inc.—Complaint.
Spectrum Information Technologies, Inc. et al. v. Microcom, Inc.—Answer and Counterclaims.
Spectrum Information Technologies, Inc. et al. v. Microcom, Inc.—Answer to Counterclaims.
Spectrum Information Technologies, Inc. et al. v. Microcom, Inc.—Judgement.
Stone, P.S. "286 Laptop", Info World News, Apr. 25, 1988, p. 5.
Stone, PC Magazine, May 15, 1990, p. 220, "Keeping in tough; on-the-road communication needs".
Stone, Infoworld, Sep. 7, 1987, p. 12, "Companies Join to develop 2,400-BPS Cellular Modems".
"Technical Aspects of Data Communication," John E. McNamara, Jul. 1979, Digital Press.
Vodafone News, Feb. 13, 1985, pp. 1–2, "Data First for Racal-Vodafone".
Bridge Between Data Communications and Cellular Telephone, Data Communications, Sec. New Products, Feb. 1985, p. 218.
ABIX: Landline Emulator For Cellular, Stuart Crump, Jr., Personal Communications Technology, Jun. 1986, p. 39.
Ameritech Nondisclosure Agreement, Jun. 1, 1985.
Letter from A. Jason Mirabito, Gaston & Snow, Feb. 28, 1990 re: US Patent 4,697,281.
High-tech Cellular Products Demonstrated, Ameritech, vol. 3, No. 34, Sep. 25, 1985.
Van Kirk, PC Computing, Nov. 1989, p. 136, "Have your car call my car . . . ".
Welch, Infoworld, Feb. 3, 1986, p. 14, "ModemLinks Micros to Car Phones".
Zimmerman, PC Week, Jun. 18, 1990, p. 49, "Toshiba modem boasts wireless transmission . . . ".
Document cited in U.S. Patent No. 4,654,857 issued Mar. 31, 1987, "Millicom Cellular Portable Telephone Article".

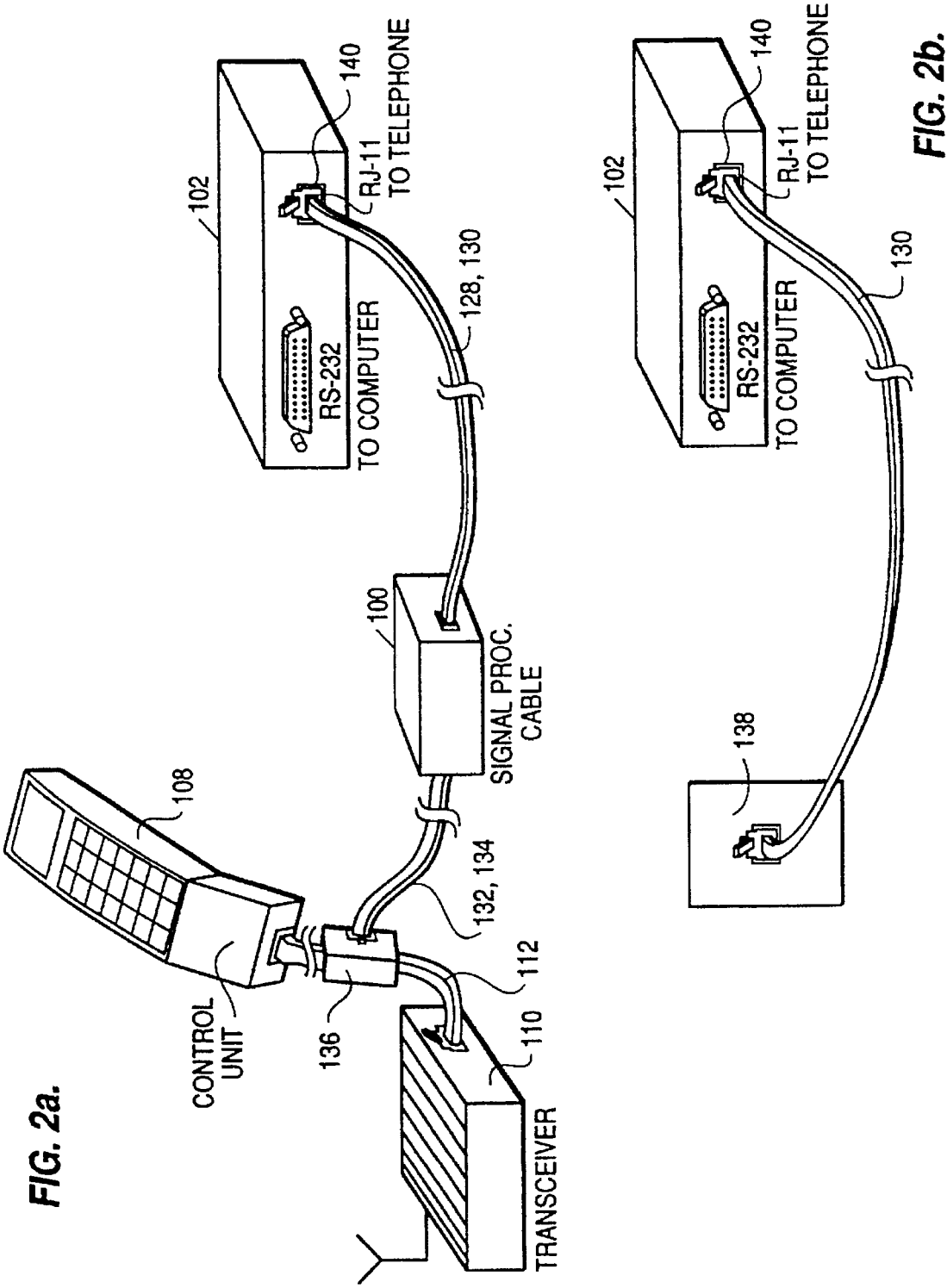

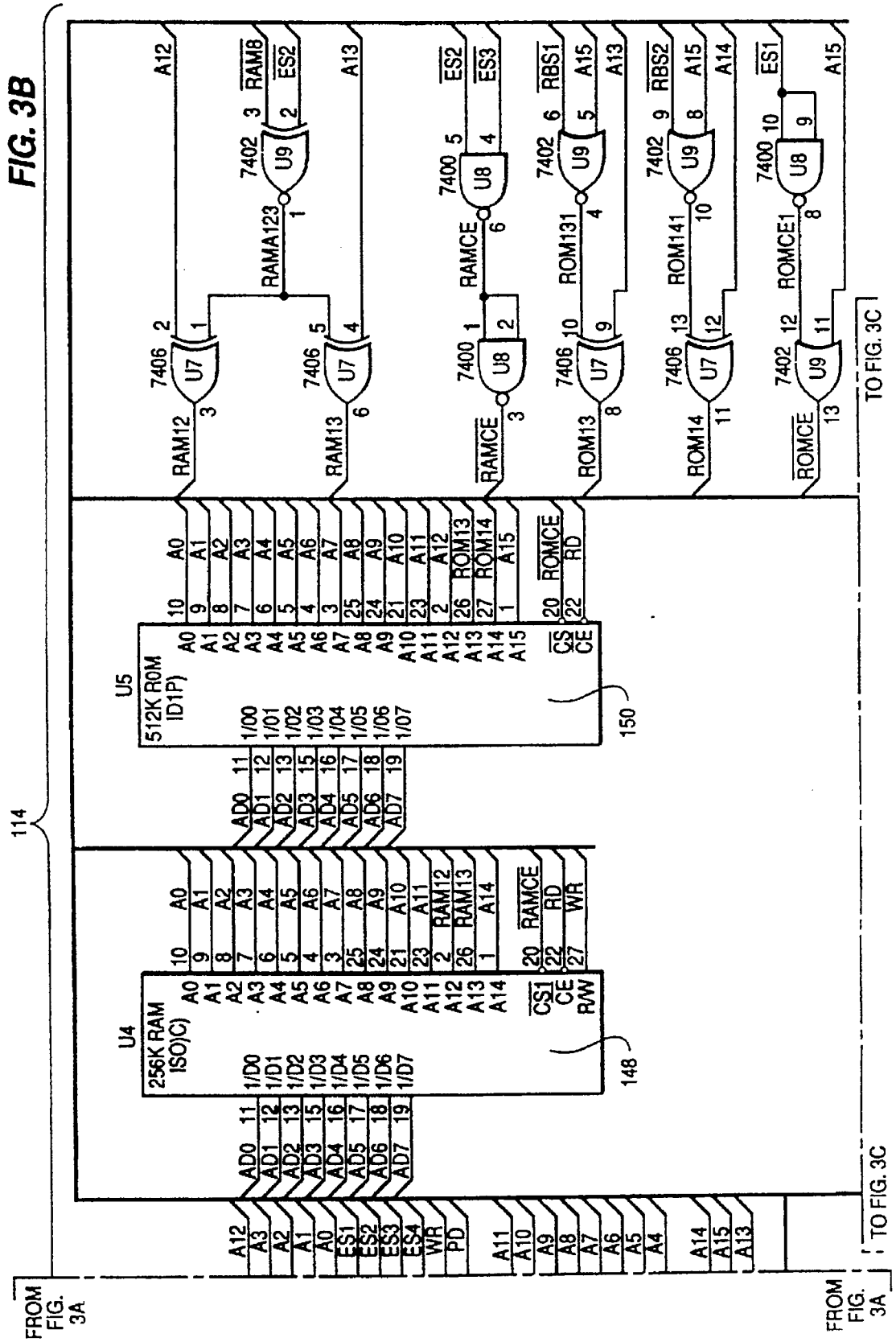

METHODS AND APPARATUS FOR CONTROLLING DATA TRANSMISSION USING RADIO DEVICES

This is a Divisional application of Ser. No. 08/178,474 filed Jan. 6, 1994 (issued as U.S. Pat. No. 5,353,334), which is a continuation of Ser. No. 07/866,879 filed Apr. 10, 1992 (abandoned) which is a divisional of Ser. No. 07/531,762 filed Jun. 1, 1990, (issued as U.S. Pat. No. 5,127,041). The specification includes a microfiche software appendix (1 fiche, 33 frames).

BACKGROUND OF THE INVENTION

The present invention is a novel modem and interfacing system that permits connection of a single cellular-capable modem to a variety of cellular transceivers or to a landline telephone jack.

In the prior art, modems specifically designed for cellular use were designed to connect to a single type of cellular bus. For example, the inventor's prior U.S. Pat. No. 4,697,281 describes one of the earliest commercially successful cellular modems. This modem includes integral interfacing software and hardware that is specific to the type of cellular transceiver used with the modem. Thus, a modem designed to work, for example, with a Motorola transceiver will not operate with an Oki transceiver. It would be desirable to develop a system that would permit a single, generic modem to operate with a variety of transceivers.

These prior art modems also are not designed to interface conveniently with a landline telephone jack. To interface with a landline telephone jack, these modems would have to be provided with separate landline connection hardware and operating software, adding cost and complexity. Because cellular modems are relatively expensive, it would be desirable to use a single modem for a variety of mobile and fixed-station data transmission tasks. The inability of a single modem to function easily in both environments is particularly troublesome when the modem is installed internally in a portable computer. If a portable computer is equipped with a modem that operates only in the cellular environment, an auxiliary modem must be provided to allow data transmission when the portable computer is used in an office setting. Similarly, if the portable computer's internal modem is not cellular-compatible, a separate cellular modem must be carried with the mobile unit. The need to carry a separate cellular modem with significant weight and dimensions reduces the convenience and portability, and thus the usefulness, of the portable computer/cellular telephone combination. Therefore, the lack of landline capability is a significant disadvantage for cellular modems.

The prior art includes systems which are distantly related to the system of the present invention, but none of these prior art systems provides a method of selectively connecting a single cellular-capable modem to a variety of cellular transceivers or to a landline telephone jack.

Some prior art interfacing systems, which will be referred to as telco emulators, permit operative connection of a variety of ordinary analog telephone sets to cellular transceivers by simulating a landline telephone connection. Such systems are disclosed in U.S. Pat. Nos. 4,737,975 to Shafer, 4,775,997 and 4,658,096 to West, Jr. et al., and 4,718,080 to Serrano et al. U.S. Pat. No. 4,012,596, also to West, Jr. et al., shows a similar system for connecting an ordinary telephone device to a simplex radio system. U.S. Pat. No. 4,887,290 to Dop et al. shows a cellular alarm backup system which can selectively connect either ordinary house phones or a digital alarm communicator to a cellular transceiver. It should be noted that, for reasons explained in the inventor's prior U.S. Pat. No. 4,697,281, an ordinary home or office modem will not function properly in a cellular environment.

Telco emulators have been used to connect modems to cellular transceivers. For example, U.S. Pat. No. 4,837,800 to Freeburg, et al. shows a telco emulator, the Motorola "CELLULAR CONNECTION," used to connect a cellular modem to a cellular transceiver. However, the telco emulator suffers from a high cost of production. These emulators must provide for Tip and Ring current, ringing voltage, and DTMF (touch-tone) reception and decoding. Each of these functions adds cost and complexity to the telco emulator. Further, the telco emulator must address the special dialing needs of the cellular transceiver, such as generating a SEND command. The telco emulator is also incapable of returning detailed status information and data from the cellular telephone to the connected device, since the telco emulator assumes that the device is not programmed to operate in a cellular environment. As a result of all these factors, the telco emulator method provides suboptimal control of the cellular transceiver in cellular modem applications as compared to the system of the present invention.

Radiotelephone interfacing systems not related to modems have also been developed in the prior art. U.S. Pat. No. 4,852,146 to Hathcock et al. shows an auxiliary dialing system that connects between a cellular handset and a cellular transceiver, but this system does not connect a generic device to a specific cellular transceiver. U.S. Pat. No. 4,752,949 to Steinbeck et al. discloses an interface system for connecting a cordless telephone to a base unit by installing a cord. The cord includes both data signal lines and control lines.

It is well-known in the landline PBX art to transmit both digital control and analog information signals through the same connector in a modular telephone wiring system. Some of these systems, as exemplified by the system disclosed in U.S. Pat. No. 4,759,059, allow ordinary analog telephone devices to connect to a digital telephone system. The analog devices then use analog lines of the telephone system but are not connected to digital control lines of the telephone system.

Finally, it is also known to contest a plurality of telephone units to one or more cellular transceivers, as illustrated in U.S. Pat. Nos. 4,890,315 to Bendixen et al. and 4,568,800 to Orikasa.

However, none of the prior art systems disclose a single, cellular-capable modem and cost-effective means that permit selective connection of the modem either to a variety of cellular transceivers or to a landline telephone jack.

SUMMARY OF THE INVENTION

It is a general object of the present invention to provide a novel system and method for accessing telephone networks of two or more differing types to communicate information using one of the telephone networks.

It is a general object of the present invention to provide a novel cellular modem system including a generic modem and a cellular transceiver-specific interface cable.

It is another object of the present invention to provide a novel cellular-capable modem which is adapted for ready connection either to a landline telephone jack or to a variety of cellular tranceivers.

Another object of the present invention is to provide a novel interface cable device for connecting the aforementioned cellular-capable modem to a specific cellular transceiver.

A further object of the present invention is to provide a novel interface cable device adapted to connect a cellular-capable modem to a plurality of cellular transceivers.

It is a more specific object of the present invention to provide a novel cellular-capable modem which is provided with a single jack for connecting either to a landline telephone connector or to a variety of cellular transceivers.

Another object of the present invention is to provide a novel cellular-capable modem which can selectively transmit cellular transceiver control commands when the modem is connected to a cellular transceiver.

A further object of the present invention is to provide a novel cellular-capable modem that communicates with an interface cable connecting the modem and a cellular transceiver by using a generic command language, causing the interface cable to control the transceiver in a desired manner.

Yet another object of the present invention is to provide a novel interface cable which receives generic command language instructions from a cellular modem and produces signals adapted to control a cellular transceiver.

A further object of the present invention is to provide a novel modem for installation in a portable computer which can be used with either a cellular or a landline telephone system.

It is also an object of the present invention to provide a novel modem for installation in a portable computer which has a single connector permitting use of the modem with either a landline or a cellular telephone system.

An object of the present invention is to provide a novel modem for installation in a portable computer which produces generic command signals to control a cellular telephone connection.

It is also an object of the present invention to provide a novel system for interfacing a modem to a telephone system access device in which the modem transmits and receives generic command language signals to induce control of telephone system access device operation, and in which the generic command language signals are retransmitted if receipt of the signals is not acknowledged.

Another object of the present invention is to provide a novel interface device for connecting a cellular modem to a cellular telephone system including a control unit and a transceiver, which replaces a portion of a cellular bus connecting the control unit to the transceiver.

Yet another object of the present invention is to provide a novel system for connecting a cellular transceiver to a cellular data modem in which modulated data signals are carried on a first set of conductors and digital control signals are carried on a second set of conductors.

A further object of the present invention is to provide a novel system for interfacing a cellular modem to a cellular telephone which provides a signal imitative of a landline ring signal to the cellular modem when the cellular telephone signals an incoming call.

Another object of the present invention is to provide a novel cellular modem and a novel interface system for connecting the modem to a cellular telephone which communicate using a predefined command language and which generate signals acknowledging the receipt of command language signals.

A further object of the present invention is to provide a novel command language useful in arranging the interface between cellular modems and cellular telephone networks which includes commands for generating cellular telephone keypress signals and for obtaining cellular telephone status information.

It is also an object of the present invention to provide a novel system for sensing the connection of a cellular telephone interface cable to a cellular modem.

Another object of the present invention is to provide a novel system and method for establishing communication between a telephone system interface cable and a modem after these two devices are connected.

It is also an object of the present invention to provide a novel interface cable for connecting a cellular telephone to a modem which receives digital commands from the modem and controls thereby the operation of the cellular telephone and the transmission of computer data through analog computer data transmission lines connecting the modem to the cellular telephone.

These objects and others which will be apparent from the specification herein and the scope of the claims are achieved by providing a cellular modem having a single RJ-11 jack for interfacing either to a landline or to a cellular transceiver. The analog data transmission signals of the modem, which are compatible with landline "tip" and "ring" lines, are provided on the third and fourth terminals of the RJ-11 connector. When the modem is to be used as a landline modem, the RJ-11 connector can be connected directly to a standard landline telephone jack using an ordinary modular telephone wire.

If the modem is to be used with a cellular transceiver, the modem generates transceiver operation commands according to a predefined universal command language which is not specific to a particular transceiver. The modem's RJ-11 connector is connected to the cellular transceiver using an appropriate interface cable which includes a microprocessor (a "signal processing cable"). The universal language commands are transmitted in serial digital form on the fifth terminal of the RJ-11 connector. The signal processing cable acknowledges the commands received and alerts the modem to cellular-telephone-related events via a serial digital signal transmitted to the second terminal of the RJ-11 connector. The signal processing cable then transmits control signals to the transceiver, with the signals being appropriate to the type of cellular transceiver used, to produce the function requested by the modem's universal command.

The system disclosed has substantial advantages over prior art systems for interfacing modems to cellular and landline telephone systems. With the system disclosed herein, a single modem can be connected to a landline jack or to any desired brand of cellular transceiver merely by inserting the proper cable into the modem's RJ-11 jack. The single, familiar jack design is foolproof in that it allows the user to confidently and successfully connect the modem to a desired telephone system with minimal instruction or technical understanding of modem operation.

Further, the provision of a universal command language permits the modem to be designed independently of the specifications of the cellular transceivers to which it will be connected. The signal processing cable provides a consistent interface for the modem. Economies of scale will result from producing only one type of modem, rather than making a different modem for each cellular transceiver standard. In addition, the design of the present system will allow the manufacturer to respond faster and more cost-effectively to the introduction of new cellular transceiver standards since these new standards will only require design of a new signal processing cable. While telco emulators also offer the advantage of providing a consistent interface for the modem, these emulators are more complex and thus more expensive to produce than the system of the present invention. These emulators also provide less effective control over the cellular transceiver.

The universal command language also allows the same modem to be used with an infinite variety of cellular transceivers by merely substituting a different signal processing cable. Thus, a modem owner who obtains a new cellular telephone need only purchase a relatively inexpensive signal processing cable, rather than replacing the entire modem.

In addition, a single modem that can operate through a single Jack in both landline and cellular environments will be particularly useful in portable computer applications, where space for additional jacks is limited and additional packages, such as extra modems, are quite undesirable.

Other objects and advantages of the present invention will become apparent to those skilled in the art upon review of the specification and drawings herein.

BRIEF DESCRIPTION OF THE DRAWINGS

FIG. 2a is an assembly diagram showing the connection of the signal processing cable of the present invention between a cellular transceiver and the modem of the present invention.

FIG. 2b is an assembly diagram showing the connection of an ordinary modular telephone cable between a landline telephone jack and the modem of the present invention.

FIGS. 3a through 3e together form a schematic diagram of a preferred embodiment of the modem section of the cellular data modem of the present invention designed for installation in a portable computer.

DETAILED DESCRIPTION OF A PREFERRED EMBODIMENT

Figure 1:
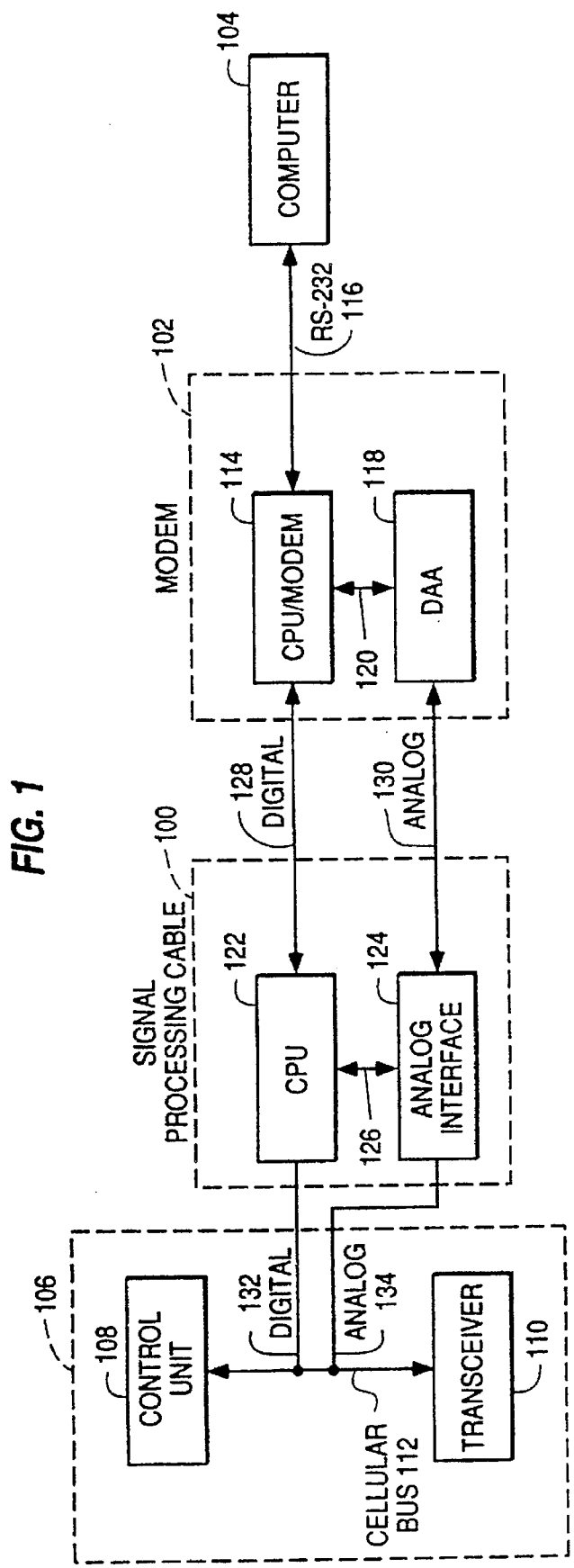
FIG. 1 is a block diagram showing the operational connection of the modem and signal processing cable of the present invention.

Referring first to FIG. 1, the data interfacing system of the present invention comprises two unitary component devices: a signal processing cable 100 and modem 102. The signal processing cable 100 and modem 102, and associated cabling, connect a computer 104 to a cellular telephone 106. Cellular telephone 106 may be any known type of cellular telephone and includes a control unit 108 connected to a cellular transceiver 110 by a cellular bus 112. The modem 102 includes a CPU/modem section 114, which may be connected to the computer 104 by an RS-232 interface cable 116. The CPU/modem section 114 is connected to DAA section 118 by analog signalling and digital control lines 120. The signal processing cable 100 includes a CPU section 122 and an analog interface section 124, connected by digital control lines 126. The CPU 122 of signal processing cable 100 is connected by digital data lines 128 to the CPU/modem section of modem 102. The analog interface section 124 of signal processing cable 100 is connected by analog data lines 130 to the DAA section 118 of modem 102. The CPU section 122 of signal processing cable 100 is also connected by digital data lines 132 to digital data lines of the cellular bus 112. The analog interface section 124 of signal processing cable 100 is connected by analog data lines 134 to analog transmission lines of the cellular bus 112.

If the modem 102 is used to connect to a cellular telephone network (not shown) using the cellular transceiver 110, the CPU/modem section 114 of modem 102 will generate generic cellular telephone operation commands according to a predefined universal command language, which is not specific to a particular cellular telephone 106. Some of these generic command language commands may be specifically designed to function only with a subset of the existing body of cellular telephones, but by the term "generic command language" it is meant that at least some of the commands will be generic. The generic command language signals are transmitted as serial digital signals over digital data lines 128 to the CPU 122 of signal processing cable 100. The CPU 122 of signal processing cable 100 is programmed to acknowledge the commands received via another serial digital signal transmitted on digital data lines 128. The signal processing cable 100 then generates device-specific command language signals which are transmitted via digital data lines 132 to the cellular bus 112. These device-specific command language signals are designed to emulate signals produced by the control unit 108 to produce desired control functions of transceiver 110 according to the generic command language command that was received from CPU/modem section 114 of modem 102.

Figure 2C:
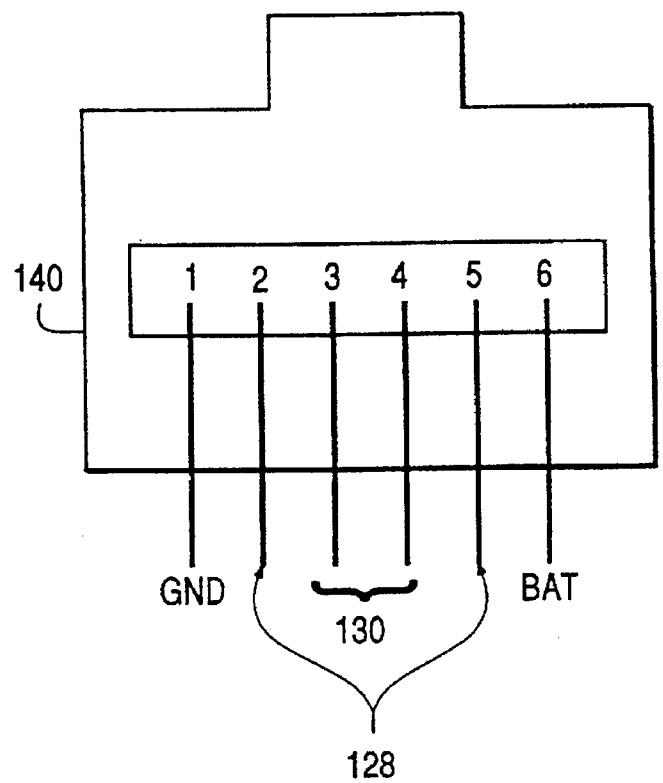
FIG. 2c is a diagram of a standardized, unitary electrical connector used, as shown in FIGS. 2a and 2b, to connect the modem of the present invention to landline telephone systems or to other types of telephone system.

The modem 102 of the present invention can be used with either a cellular telephone system or with a landline telephone system. In FIG. 2a, use of the modem 102 with a cellular telephone system is illustrated. The modem 102 is shown connected via signal processing cable 100 to a three-way connector 136 interposed in cellular bus 112. In FIG. 2b, the modem 102 is shown connected to a landline telephone system. For landline use, the modem 102 is connected via an ordinary modular telephone cable containing analog lines 130 to a landline RJ-11 jack 138. As shown in FIGS. 2a, 2b, and 2c, modem 102 is provided with a standard 6-position RJ-11 jack 140 for connecting either to the landline telephone jack 138, or to the cellular bus 112 via the signal processing cable 100. The six terminals of the RJ-11 jack carry the signals indicated in Table A. The method developed to transmit signals from the modem 102 to the signal processing cable 100 and the assignment of signals to terminals, as shown, is a novel feature of the invention and has particular utility. The modulated data signals that are to be transmitted and received by the modem 102 are transmitted and received on the TIP and RING lines. These lines are assigned to pins three and four respectively of the RJ-11 jack 140. The assignment of the analog data signals to transmission lines separate from control data transmission lines, and particularly to the terminals three and four, which correspond to the TIP and RING terminals used by landline RJ-11 connections, allows the RJ-11 jack 140 of the modem to be connected directly to the landline telephone jack 138 using a standard modular line cord as shown in FIG. 2b. In the preferred embodiment, the TIP and RING lines are not provided with a DC signal by the signal processing cable, but of course a DC level signal could be added if desired.

The GND signal on pin 1 of the RJ-11 jack 140 serves as a reference ground for all the analog and digital signals carried through the RJ-11 jack 140. The BAT voltage is provided directly from the cellular telephone bus 112. The voltage and current provided on the BAT terminal will vary depending on the model of the cellular telephone 106. Typically, the cellular bus 112 will provide the BAT terminal with at least 120 mA at 7.5 volts DC. The BAT signal in some cases may also be switched on and off by the cellular telephone 106.

TABLE A

RJ-11 ELECTRICAL CONNECTIONS

| PIN | FUNCTION |
|---|---|
| 1 | GND - common ground |
| 2 | SCOUT - serial data from signal processing cable |
| 3 | TIP - signal processing cable analog transmit |
| 4 | RING - signal processing cable analog receive |
| 5 | SCIN - serial data to signal processing cable |
| 6 | BAT - signal processing cable provided DC voltage |

When the modem 102 is to be used in a cellular environment, as shown in FIG. 2b, the SCOUT (Serial Cable OUTput) and SCIN (Serial Cable INput) serial digital data signals on pins two and five of the RJ-11 jack 140, respectively, are used to transmit the generic command language signals. The SCOUT and SCIN lines thus correspond to the digital data lines 128 shown in FIG. 1. The transmissions on SCOUT and SCIN might be programmed to occur regardless of whether the modem 102 is being used in a cellular environment, but it is preferred that these transmissions occur only when the signal processing cable 100 is connected to the modem 102.

The preferred serial commands transmitted between he signal processing cable 100 and the modem 102 on the SCIN and SCOUT lines are shown in Table B. As shown, each command code consists of two hexadecimal digits which combine to form a single byte code. Naturally, numerous other command codes of varying types and lengths could be assigned to the functions shown, and additional desired functions could be implemented. For example, the descriptions of the command functions in Table B could themselves be transmitted in ASCII form as English-language command codes.

TABLE B

GENERIC SIGNAL PROCESSING CABLE COMMAND LANGUAGE

| COMMAND (HEX) | FUNCTION |
|---|---|
| 00 | Smart Cable Acknowledge (SCACK) |
| 01 | Emulate keypress "1" |
| 02 | Emulate keypress "2" |
| 03 | Emulate keypress "3" |
| 04 | Emulate keypress "4" |
| 05 | Emulate keypress "5" |
| 06 | Emulate keypress "6" |
| 07 | Emulate keypress "7" |
| 08 | Emulate keypress "8" |
| 09 | Emulate keypress "9" |
| 0A | Emulate keypress "0" |
| 0B | Emulate keypress "SEND" |
| 0C | Emulate keypress "END" |

TABLE B-continued

GENERIC SIGNAL PROCESSING CABLE COMMAND LANGUAGE

| COMMAND (HEX) | FUNCTION |
|---|---|
| 0D | Emulate keypress "LOCK" |
| 0E | reserved for future use |
| 0F | Modem acknowledge (MACK) |
| 10 | Data call initiate |
| 11 | Put cellular phone ON HOOK |
| 12 | Take cellular phone OFF HOOK |
| 20 | Status information request |
| 21 | Status information response |
| 22 | Display information request |
| 23 | Display information response |
| 24 | Debug request |
| 55 | Alert information |

As a particular feature of the invention, all commands transmitted will be acknowledged with either the SCACK or MACK signal, as appropriate, when execution is complete. If a command has not been acknowledged within three seconds, the device sending the command (either the modem 102 or the signal processing cable 100) will assume that the transmission was garbled and retransmit the information. If the device that is to receive the information fails to respond after three consecutive transmissions, the transmitting device will assume that the other device is disconnected or turned off. The transmitting device will then cease attempts to communicate and generate a signal informing the user or the computer of the failure. For example, if the signal processing cable 100 fails to respond to the modem 102 three times in a row, the modem may send a signal to the computer 104 indicating that the modem 102 is not connected to the cellular telephone 106. Or, the modem 102 could energize a display device such as a light-emitting diode.

The "emulate keypress" commands to the signal processing cable 100 (01-0D) direct the signal processing cable 100 to generate signals to the cellular transceiver that are equivalent to the signals generated by the cellular control unit when the specified key is pressed on the control unit. The data call initiate command (10) directs the signal processing cable to put the cellular phone into proper condition for data transmission, including putting the cellular phone IN USE, setting proper hook condition, establishing proper TX and RX paths, turning off speakerphone, et cetera.

The status information response code (21) is transmitted by the signal processing cable in response to a status information request code (20). The status information response come (21) is followed by a single byte of information, each bit of which represents transceiver status as shown in Table C. A "1" in a bit indicates that the specified condition is in effect. The additional available bits, 4-7, can be assigned to indicate any desired operational condition of the cellular telephone which can be determined by analysis of a signal transmitted over the cellular bus 112.

TABLE C

STATUS INFORMATION RESPONSE BYTE

| BIT | CONDITION |
|---|---|
| 0 | IN USE |
| 1 | NO SERVICE |
| 2 | LOCK |

TABLE C-continued

STATUS INFORMATION RESPONSE BYTE

| BIT | CONDITION |
| --- | --- |
| 3 | ROAM |
| 4–7 | reserved for future use |

The display information request command (22) requests transmission by the signal processing cable of the contents of the cellular control unit display. The signal processing cable responds to the display information request command with a display information response code (23), followed by a 32-byte ASCII representation of the current characters displayed on the control unit screen. Leading display elements are filled with null characters (ASCII 0).

The debug request command (24) is used during development and testing to transmit data directly to the cellular telephone bus 112. The modem 102 transmits the debug request command to the signal processing cable 100, followed by a single byte representing the number of bytes to be transmitted to the cellular bus 112. The bytes to be transmitted to the cellular bus 112 are then sent. The signal processing cable 100 passes these data bytes directly to the cellular bus 112 without translation of the base data. However, the signal processing cable 100 will provide the data to cellular bus 112 with byte formatting and protocols appropriate to the cellular bus 112. The debug request command (24) could also be used to transmit signals specific to the cellular telephone being used under control of the computer 104 or of the modem user. In this way, non-generic command signals could be generated by the signal processing cable 100. A similar command could also be provided to permit modem 102 to receive non-generic responses from cellular bus 112.

When the cellular telephone 106 rings, an alert sequence is generated by the signal processing cable 100. This alert sequence begins with a 25 Hertz square wave transmitted on SCOUT. The square wave follows the cadence of the cellular telephone ringing tone, typically one second on followed by two seconds off. An alert information code (55) is then generated by the signal processing cable 100, between 200 and 300 milliseconds after each square wave transmission. Preferably, the alert information code is generated 250 milliseconds after an alert sequence. For example, if the cellular telephone 106 rings twice, two cadences of 25 Hz waves and two alert information codes (55) will be generated. The alert sequence signal is a particular feature of the present invention. This signal has similar frequency and timing characteristics to the ringing signal commonly generated on landline telephones. Many currently manufactured modems are designed to recognize as ringing signals incoming signals which have frequencies of 20–60 Hz. and which are repeated periodically. Therefore, provision of a signal by signal processing cable 100 which corresponds to this requirement is a valuable feature, because the ringing detection circuitry of currently popular cellular modems will not require redesign to be compatible with the signal processing cable standard.

The SCACK signal and the MACK signal are not used in communication of the alert sequence. In fact, signal processing cable 100 will be programmed to ignore all information presented to SCIN from the time transmission of the square wave begins until 10 milliseconds after the "55" alert information code is transmitted.

The modem 102 uses this alert information code to determine whether it is a cellular telephone or a landline that is ringing. The absence of an alert information code from the signal processing cable 100 will indicate to the modem 102 that a landline call is coming in.

The wakeup sequence interaction of the signal processing cable 100 and the modem 102 will now be described in detail. This sequence occurs when the signal processing cable 100 is plugged into the RJ-11 jack 140 of modem 102. The signal processing cable 100 and the modem 102 detect this connection by monitoring the SCIN and SCOUT lines. The CPU 122 of signal processing cable 100 and the CPU/modem section 114 of modem 102 are provided with bidirectional input/output ports for the SCIN and SCOUT lines. When the signal processing cable 100 and the modem 102 are turned on, these input/output ports are initialized as input ports. The signal processing cable 100 provides a pullup for the SCIN line, and the modem 102 provides a Pullup for the SCOUT line, but the signal processing cable 100 does not have a pull up for the SCOUT line and the modem 102 does not have a pull up for the SCIN line. Thus, when the signal processing cable 100 is connected to the modem 102, the SCIN line port of modem 102 is pulled up by signal processing cable 100 to produce a digital "0" signal at the SCIN line port of modem 102. This digital signal can be read by the CPU/modem section 114 of modem 102, informing the modem 102 that the signal processing cable 100 has been connected to modem 102. Similarly, the SCOUT line port of the signal processing cable 100 will be pulled up upon connection by the modem 102. The processors of modem 102 and signal processing cable 100 may poll the SCIN and SCOUT lines respectively to determine when attachment has occurred, or the changed signals upon attachment could be used to generate an interrupt signal to CPU 122 or CPU/modem section 114 respectively. Thus, the unique design of the pullups for the SCIN and SCOUT lines, when combined with the software described herein, allows detection of the connection of the signal processing cable 100 to the modem 102. While the pullup arrangement described is the preferred means of providing connection sensing, it would also be possible within the scope of the present invention to use other methods, such as for example switches responding to the physical insertion of a connector, or "wire loop" connections from one terminal on a plug to another terminal, operable to connect two or more terminals of the receiving jack when the plug is inserted.

The wakeup sequence is preferably also programmed to execute if the signal processing cable 100 determines that the modem no longer recognizes the connection of signal processing cable 100 to modem 102. The signal processing cable 100 might make this determination, for example, if a ring signal from the signal processing cable 100 is not answered by the modem 102 or if the modem 102 replies to a signal of signal processing cable 100 with an incorrect protocol. There are a number of reasons why the modem 102 might cease to recognize the connection of the signal processing cable 100. As an example, the user of the modem 102 might have turned the modem off and turned it back on.

In the preferred embodiment, the signal processing cable 100 will initiate the wakeup sequence upon detecting the connection of signal processing cable 100 to the modem 102. When the signal processing cable 100 determines that a wakeup sequence should be transmitted, the signal processing cable 100 will transmit digital signals on the SCOUT line at its maximum available speed, generally either 4800, 2400, 1200, or 300 bits per second. The initial signal transmitted by signal processing cable 100 will be 16 bits of alternating "1"s and "0"s, starting with a "1" (ground). The modem 102 will be programmed to respond to the wakeup sequence transmission from the signal processing cable 100. The modem 102 will wait eight bit periods following receipt of the 16th bit of the initial wakeup signal from signal processing cable 100. Modem 102 will then transmit the same initial signal to signal processing cable 100 on the SCIN line. Within eight bit periods after receiving the 16th bit of the signal from modem 102, the signal processing cable 100 will transmit a SCACK signal on the SCOUT line according to the protocols in Table B. Within eight bit periods after receiving the SCACK signal, the modem 102 will transmit a MACK signal on the SCIN line according to the protocols shown in Table B.

If the wakeup sequence is not completed correctly, the signal processing cable 100 will be programmed to reinitiate the wakeup sequence until the sequence is completed correctly or until the sequence has failed a specified number of times. For example, if the sequence fails four consecutive times, the signal processing cable 100 might be programmed to attempt no further wakeup sequences. The signal processing cable 100 might also be programmed to signal an error, by displaying a message on the screen of cellular control unit 108, activating a light emitting diode, etc. If the wakeup sequence fails at any time, the modem 102 will enter a wait state and do nothing until the signal processing cable 100 reinitiates the wakeup sequence. Alternatively, the modem 102 may assume that a landline-compatible connection has been provided and proceed in an operational mode appropriate to a landline environment. If an attempted wakeup sequence has failed in this manner and the modem 102 has reverted to a landline operational mode, the modem 102 will preferably provide a signal to the computer 104 or the user indicating that the wakeup sequence failed.

Figure 7A:
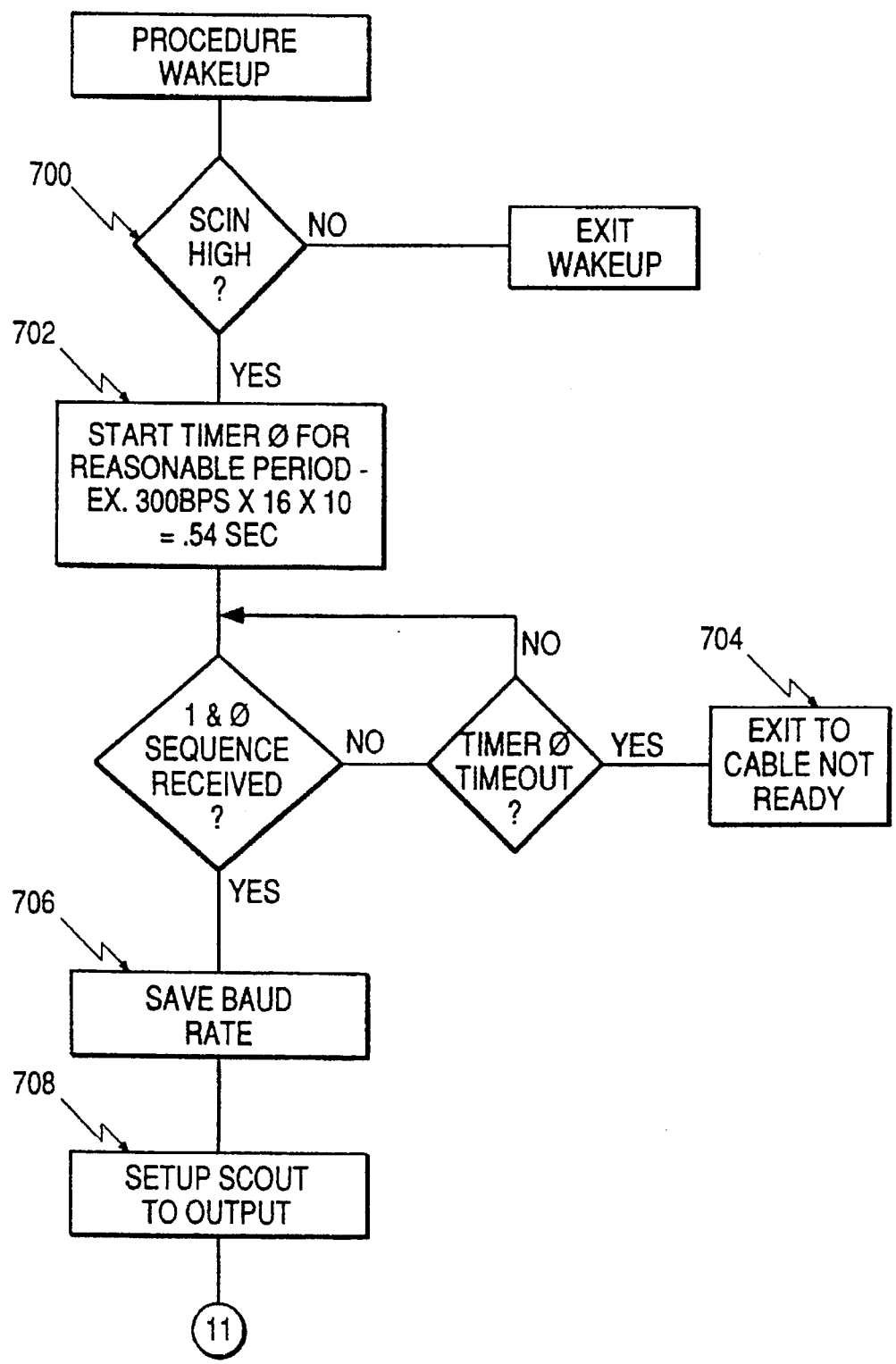
FIGS. 7a and 7b together constitute a flowchart for the wakeup procedure of the modem of the present invention.
Figure 7B:
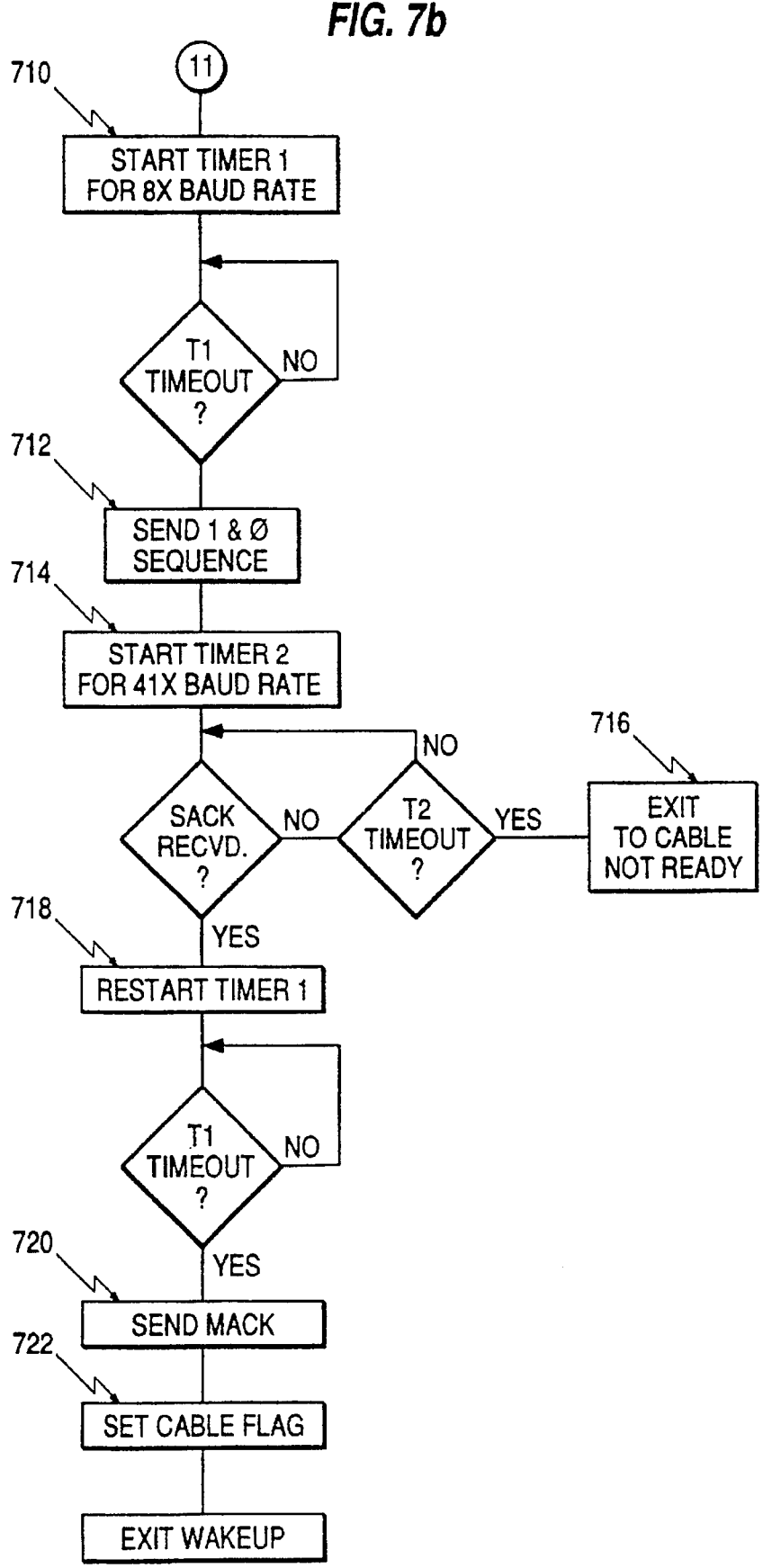

FIGS. 7a and 7b together constitute a flowchart for the wakeup procedure of modem 102. The wakeup procedure does not operate until the SCIN line input to modem 102 goes high as shown in block 700. Thereafter, a timer TIMER0 is started as shown in block 702, which may be a 0.54 second timer if 300 baud communications are used. If the alternating 1 and 0 sequence is not received before timeout of TIMER0, the cable is not ready and block 704 operates to transfer control to the exit-cable not ready procedure of FIG. 9. If the alternating 1 and 0 sequence is received correctly, the modem 102 will determine the baud rate of the transmission and save an indication of the baud rate in memory for future reference as indicated in block 706. The SCOUT line is then set up for output in block 708. A timer TIMER1 is begun in block 710, with the timer TIMER1 being set for the length of time required to transmit eight bits at the baud rate noted in block 706. After the timer TIMER1 times out, a reply sequence is transmitted as shown in block 712. A timer TIMER2 is then activated as shown in block 714 for the period of time required to send 41 data bits at the baud rate noted in block 706. If a SCACK signal is not received from the signal processing cable 100 within the period of TIMER2, control is transferred to block 716 which causes the exit-cable not ready procedure of FIG. 9 to be executed. The TIMER1 timer is then restarted to produce a delay equivalent to eight bit transmission time periods. After the TIMER1 timer times out, the modem 102 sends a MACK signal as shown in block 720 and sets a "cable" flag in the memory of modem 102 indicating that communications have been established with the signal processing cable 100, as shown in block 722.

Figure 9:
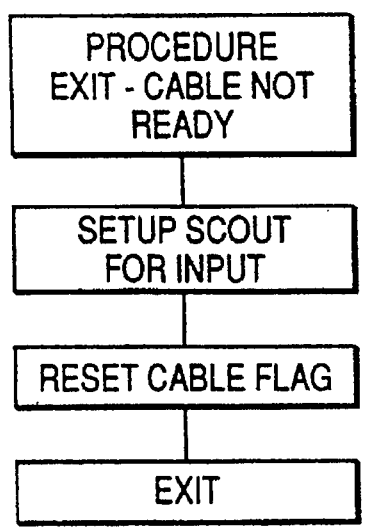
FIG. 9 is a flowchart for the exit-cable not ready procedure of the modem of the present invention.

FIG. 9 is a flowchart showing a preferred embodiment of the exit-cable not ready procedure of modem 102. The exit-cable not ready procedure provides that the SCOUT line should be set up as an input and the "cable" flag should be reset to indicate that communications have not been established with signal processing cable 100. Thus, when the procedure of FIG. 9 has been executed, the modem 102 will be placed in a mode wherein connection of the signal processing cable 100 can be attempted again, and wherein the modem 102 will operate under the assumption that only a landline telephone line is connected.

Of course, the wakeup sequence could also be initiated by a transmission from the modem 102 since the modem 102 is also capable of sensing the connection of the signal processing cable 100 to the modem 102. If this mode of operation were desired, the modem 102 would initiate the wakeup sequence upon detection of the connection by transmitting digital signals over the SCIN line at a predetermined speed known to be compatible with the signal processing cable 100, either 4800, 2400, 1200, or 300 bits per second. The initial signal transmitted by modem 102 would be 16 bits of alternating "1"s and "0"s, starting with a "1" (ground). The sisal processing cable 100 would be programmed to respond to the wakeup sequence transmission from the modem 102. The signal processing cable 100 would wait eight bit periods following receipt of the 16th bit of the initial wakeup signal from modem 102. Signal processing cable 100 would then transmit the same initial signal to modem 102 on the SCOUT line. Within eight bit periods after receiving the 16th bit of the signal from signal processing cable 102, the modem 102 would then transmit a MACK signal on the SCIN line according to the protocols in Table B. Within eight bit periods after receiving the MACK signal, the signal processing cable 100 would transmit a SCACK signal on the SCOUT line according to the protocols shown in Table B to complete the wakeup sequence.

While the modem 102 has been shown in FIGS. 1, 2a and 2b as being separate from the computer, it is also possible to design a modem 102 according to the present invention that is installed internally to the computer. Such an internal modem has particular utility when used with a portable computer, such as, for example, a Zenith Supersport. When equipped internally with the modem 102 of the present invention, the Zenith Supersport computer can be plugged into a landline telephone jack to transmit over landlines. The Zenith computer with the modem 102 can also be plugged into a cellular telephone 106 by means of an appropriate signal processing cable 100 for cellular data transfer. A modem 102 designed for internal installation in a Zenith Supersport computer is shown in FIGS. 3a through 3e and 4.

The diagrams of FIGS. 3a through 3e and 4 constitute a single circuit in which labeled lines are connected to other lines bearing the same labels, although these connections have been omitted in some cases for clarity. Where connections have been omitted, a diamond-shaped device indicates a connection to another line or lines in the same FIGS. (3a through 3e or 4), while a pennant-shaped device indicates a connection to a line or lines in the other of the FIGS. 3 and 4. The connections within FIGS. 3a through 3e are indicated by the legends in these Figures.

Figure 3A:
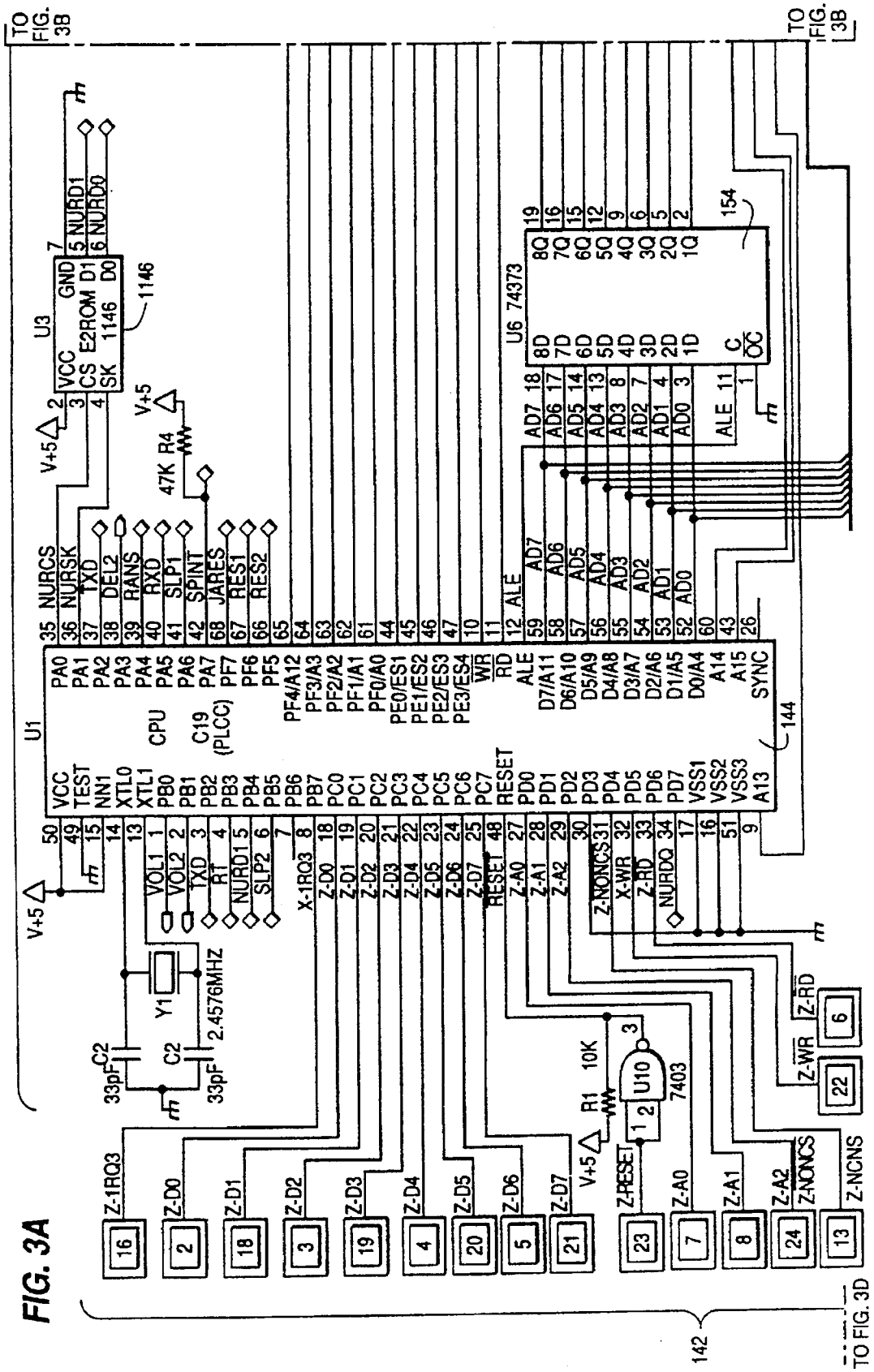

In FIGS. 3a through 3e, a schematic diagram of the CPU/modem section 114 of a modem 102 designed for internal installation in a Zenith Supersport computer is shown. The CPU/modem section 114 (and the DAA section 118 shown in FIG. 4) are preferably constructed on a circuit board designed to fit into the modem card slot of the Zenith Supersport computer. Referring now to FIG. 3a, the CPU/modem section 114 is provided with appropriate edge connections 142 for connecting to the Zenith Supersport modem connector. The functions of the lines and pins of the Zenith modem bus are as described in Service Manual Portable Computer ZWL 200-2/4 Zenith Part No. 585-295 and Technical Specifications for Internal 2400 Baud Modem Part No. 150-418, which are available from Zenith, Inc. and which are incorporated herein by reference.

The CPU/modem section 114 includes CPU 144, EEROM 146, RAM 148, ROM 150, power supply section 151, modem chip 152, and demultiplexer 154. Table D shows sample model numbers and manufacturers for the integrated circuit components. The CPU/modem section 114 also includes numerous interfacing components including capacitors, resistors, transistors, and logic gates which are connected as shown in FIGS. 3a through 3e.

TABLE D

COMPONENT MODELS AND MANUFACTURERS

| Reference # | Model | Manufacturer |
| --- | --- | --- |
| 144 | C19 PLCC | Rockwell |
| 146 | 9346 | National Semiconductor |
| 148 | 55257 | Toshiba |
| 150 | 27512 | Toshiba |
| 152 | R6634 | Rockwell |
| 154 | 74373 | Motorola |
| 158, 159 | TL072 | Texas Instruments |
| 160, 161 | TL072 | Texas Instruments |
| 162 | V250LA2 | General Electric |
| 164 | LH1056E | AT&T |
| 166 | TTC-143 | Timura |
| 168 | 7403 | Motorola |

The CPU 144 controls the operation of modem 102 according to the program stored in the ROM 150. the ROM 150 (shown in FIG. 3b). The operation of certain program procedures stored in ROM will preferably be according to the flowcharts shown in FIGS. 6, 7a, 7b, 8, 9, and 10. The CPU 144 will receive data to be transmitted from the Zenith computer, and instruct the modem chip 152 (shown in FIG. 3c) to modulate and transmit the data. The CPU will also accept data received and demodulated by the modem chip 152, transmitting this data to the Zenith computer. The software program stored in ROM 150 will preferably also implement a cellular-compatible protocol including forward error correction, variable packet sizing, and compensation for loss of carrier during cell handoffs. Such a protocol is described in the inventor's prior U.S. Pat. No. 4,697,281, the disclosure of which is incorporated herein by reference. It will also be desirable for the software program stored in ROM 150 to select different protocols depending on the conditions encountered. For example, the software may select a cellular-compatible protocol when the signal processing cable 100 is connected to the modem 102 and may select a second, more general landline compatible protocol when the modem 102 is connected to a landline telephone jack. As will be seen, the modem 102 can detect the presence of signal processing cable 100 by sensing the pullup of the SCIN line within signal processing cable 100.

The software program in ROM 150 will further cause the CPU 144 to transmit commands to the signal processing cable 100 and receive data and acknowledgement signals from the signal processing cable 100, according to the command language protocols described herein, to set up and monitor cellular calls whenever cellular data communication is requested by the Zenith Supersport computer.

Figure 6:
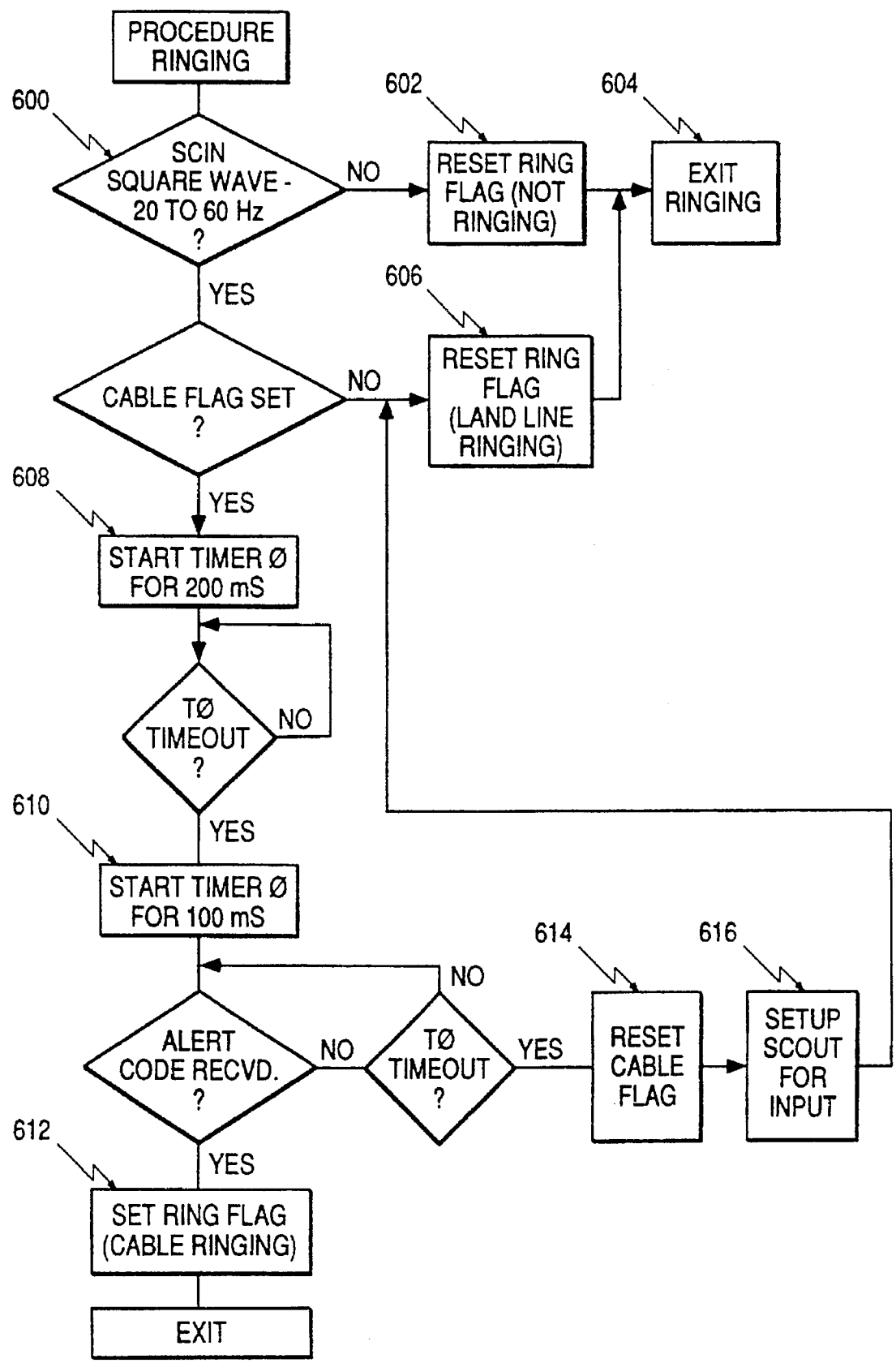
FIG. 6 is a flowchart for the ringing response procedure of the modem of the present invention.

Referring now to FIG. 6, a flowchart for a preferred software embodiment of a ringing response procedure of modem 102 is shown. When the ringing procedure becomes active, the modem 102 will monitor the SCIN line to determine whether a ringing signal is present as shown in block 600. If not, a "ring" flag which indicates that a line is ringing will be reset in block 602 and the ringing procedure will be exited in block 604. If the ringing signal is present and the "cable" flag of the memory of modem 102 is not set, indicating that a signal processing cable 100 is not connected, the "ring" flag will be set as shown in block 606 to indicate that the landline connection is ringing, and control will be returned to the standard program of modem 102 which will operate to answer the landline call. If the "cable" flag is set when a ringing signal is present, the cellular line is ringing, and control is transferred to block 608. In block 608, a timer TIMER0 of 200 ms duration is started. After the timer TIMER0 times out, the timer TIMER0 is restarted for a 100 millisecond period. If an alert code is received from the signal processing cable 100 during the period of timer TIMER0, the "ring" flag will be set to indicate that the cellular line is ringing as shown in block 612 and control will be returned to the main modem program which will answer the cellular call to provide cellular data communications. If the timer TIMER0 times out without an alert code being received by modem 102, the "cable" flag will be reset to indicate that a problem exists with the communications link between signal processing cable 100 and modem 102, as shown in block 614. The SCOUT line will be set up for input, as shown in block 616, control will be transferred to block 606, and operation will continue as though a landline call had been received.

In both the cellular and landline systems, placement of a call to another station is accomplished by dialing a telephone number. A telephone number is a type of "address" which identifies the telephone or other equipment to which a call is directed. The act of specifying a call destination in a network may be referred to generally as "addressing" or more specifically "dialing".

Figure 8:
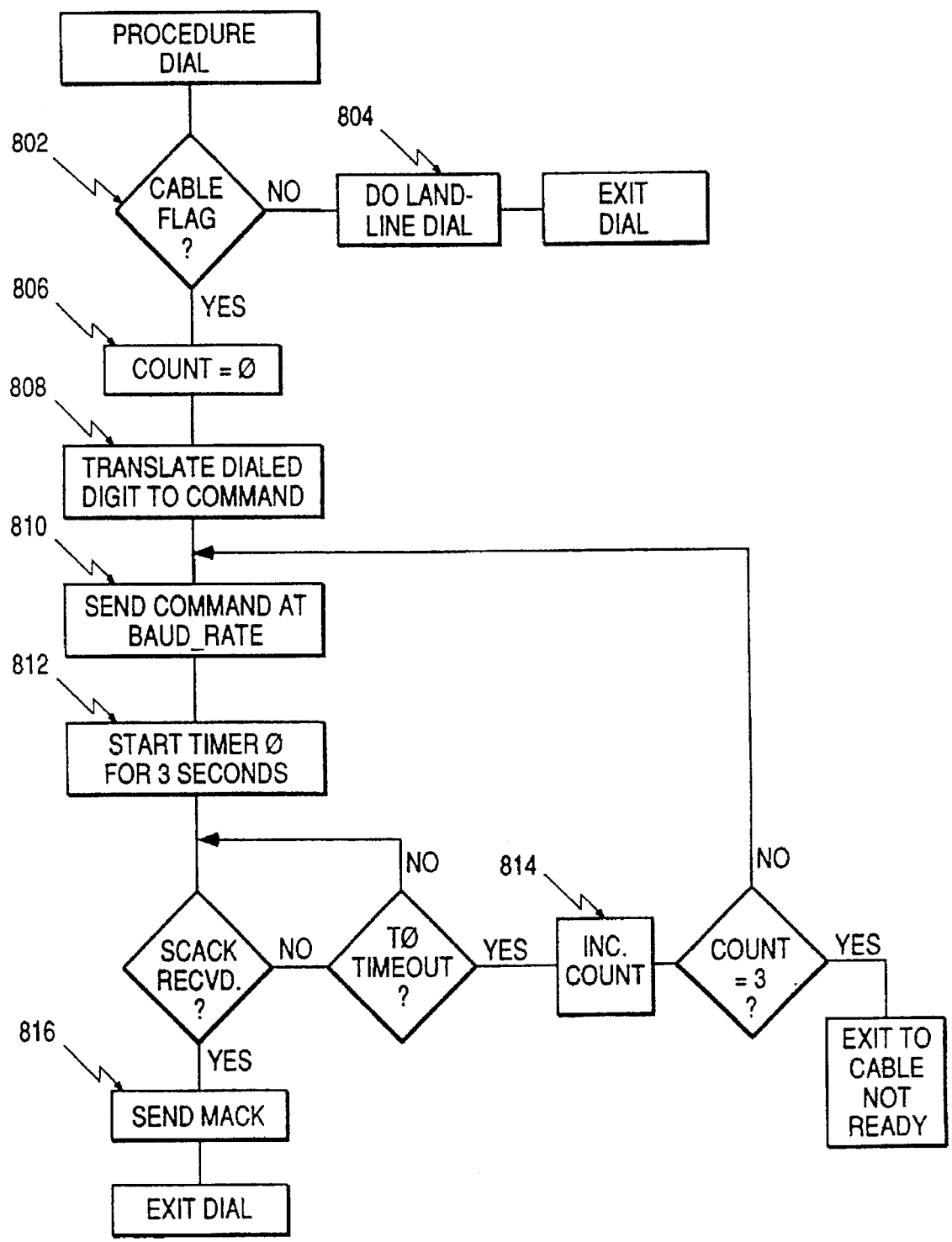
FIG. 8 is a flowchart for the dial procedure of the modem of the present invention.

FIG. 8 shows the dial procedure of modem 102. In block 802, the "cable" flag is checked to determine whether a landline or cellular line is connected. If the "cable" flag is not set, the modem 102 will commence a landline dialing sequence as shown in block 804. If the "cable" flag is set, the modem 102 will place a call using a cellular network. The COUNT variable is set to 0 in block 806. The dial procedure then translates the telephone number to be dialed (as supplied by the user or the computer connected to the modem) into a generic language command according to the command language shown in Table B, as shown in block 808. This command is transmitted to signal processing cable 100 at the appropriate baud rate stored in the memory of modem 102 as shown in block 810. A timer TIMER0 is then started for a period of three seconds as shown in block 812. If the SCACK signal has not been received by modem 102 before TIMER0 times out, the COUNT variable is incremented as shown in block 814. If the COUNT variable has reached the value of three, the modem 102 determines that communications between modem 102 and signal processing cable 100 are not functioning properly and control is transferred to the exit-cable not ready procedure as shown in FIG. 9. As long as the COUNT variable has not reached three, control will be passed back to block 810 for retransmission of the generic command. When the command has been transmitted successfully and SCACK has been received, the MACK command will be transmitted by modem 102 as shown in block 816.

Figure 10:
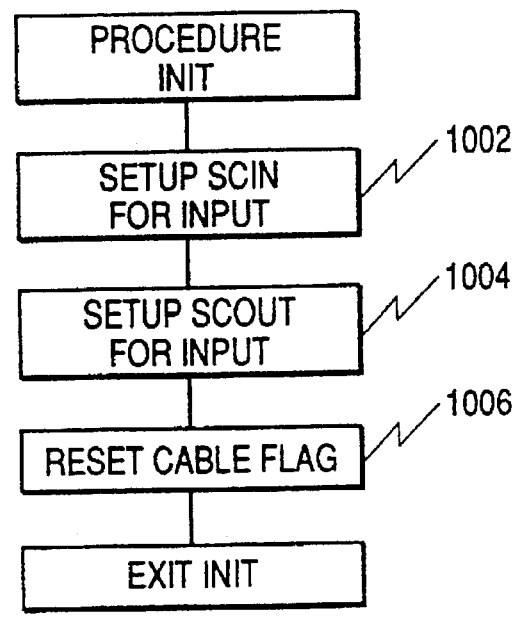
FIG. 10 is a flowchart for the initialization procedure of the modem of the present invention.

In FIG. 10, the initialization procedure for modem 102 is shown in flowchart form. This procedure is executed whenever modem 102 is reset, as at powerup, and may be executed in response to a software reset or a reset command from an attached computer. First, the SCIN line is set up for input as shown in block 1002. Next, the SCOUT line is set up for input as shown in block 1004. Next, the "cable" flag is reset to indicate that communications have not been established with signal processing cable 100, as shown in block 1006. Although other functions might be performed at initialization, this completes a preferred initialization procedure.

Figure 3C:
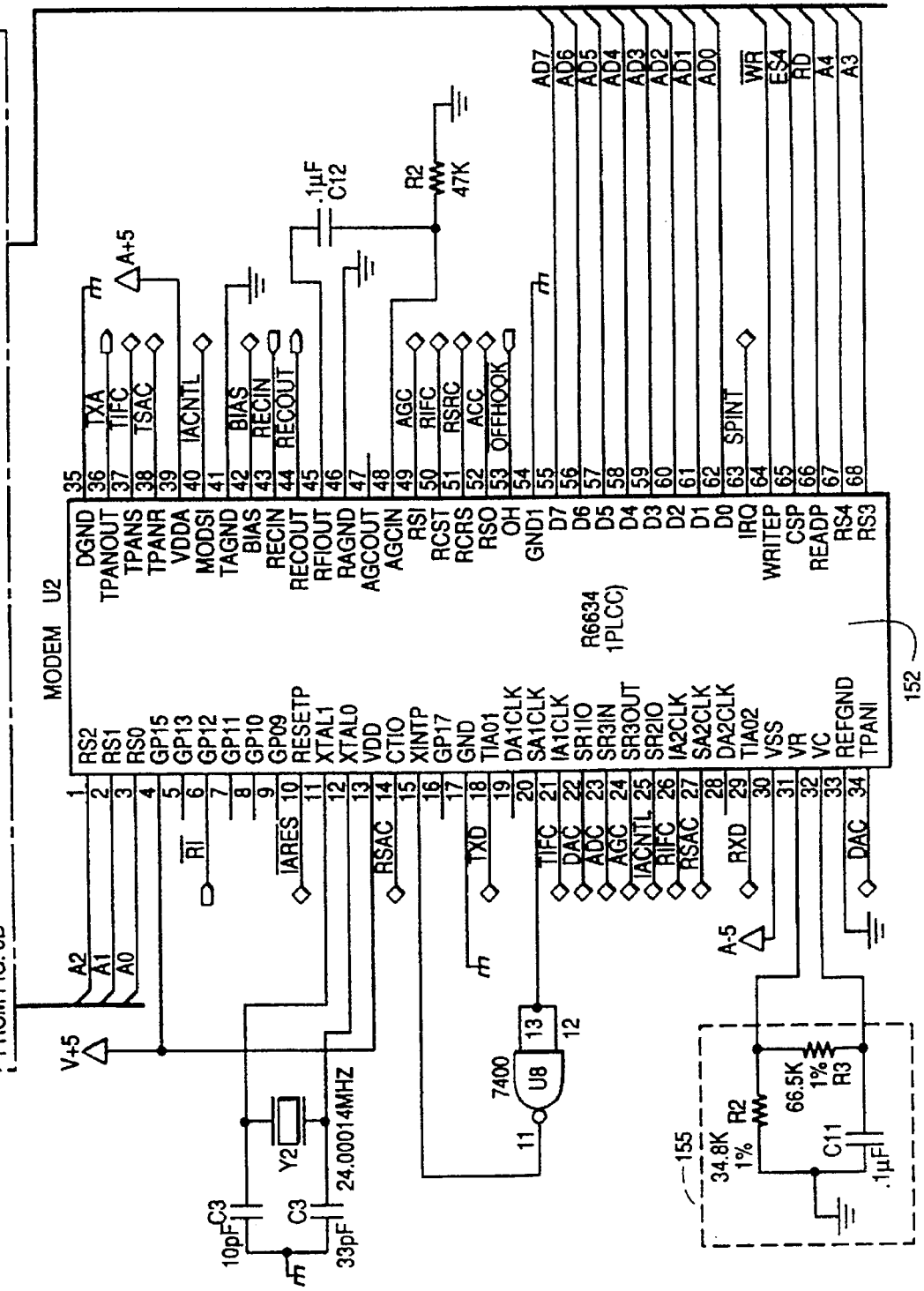
Figure 3E:
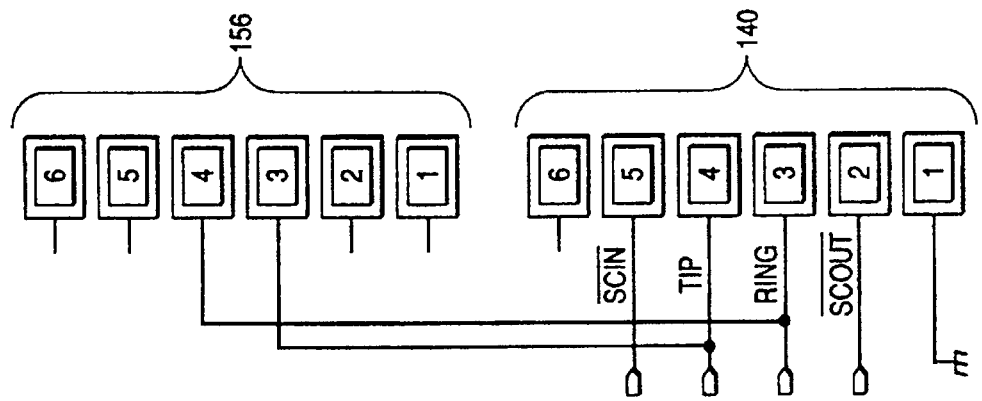

Referring now to FIG. 3e, the RJ-11 connector 140 of modem 102 is shown. The lines of this connector are connected according to the description in Table A. However, since the modem 102 will draw its power from the Zenith Supersport computer rather than from the cellular telephone 106, the BAT line of the RJ-11 connector 140 is not connected within the modem 102. In the embodiment shown in FIGS. 3a through 3e, the modem 102 is provided with a second RJ-11 connector 156. The second RJ-11 connector 156 is connected only to the TIP and RING lines of the modem 102, so that the second RJ-11 connector 156 can be used only with landline telephones. Of course, it is also possible to provide only a single RJ-11 connector 140 which can be used either with landline telephones or, with the proper signal processing cable, with cellular telephones. If a single connector is used, it would be possible to isolate the SCIN and SCOUT lines of the modem 102 whenever the modem 102 is not being used with a signal processing cable 100. Isolation of the SCIN and SCOUT lines would prevent damage to the modem 102 in case the second and fifth pins of the landline telephone cable are being used to carry landline telephone signals. Any of a number of protective circuits or switching devices, such as a simple toggle switch, could be used to limit incoming signal power on the SCIN and SCOUT lines or to disconnect these lines from the components of modem 102 when the modem 102 is used with a landline connection.

Figure 3D:
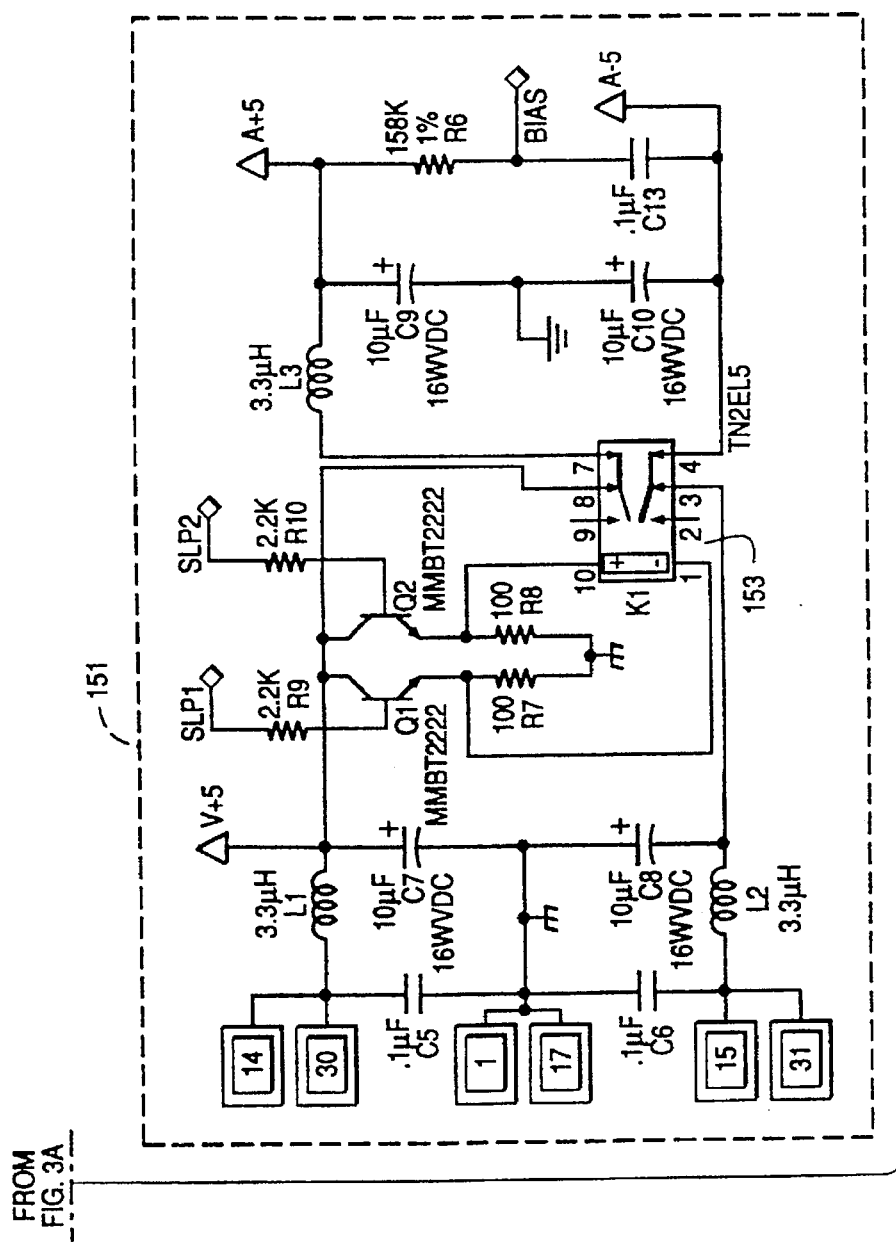

The power supply section 151 shown in FIG. 3d operates to control power to the CPU/modem section 114 and the DAA section 118. The SLP1 and SLP2 signals are generated by microprocessor 144 and are selective asserted by microprocessor 144, causing the relay 153 to enable and disable power to sections of the circuit of modem 102.

Referring to FIG. 3c, the modem chip 152 is a combination digital signal processor and analog front end (A/D and D/A converter). The modem chip 152 is provided with its own 24.00014 Mhz frequency crystal to enable timing functions for digital signal processing. The modem chip 152 is also provided with a bias section 155 which provides a bias voltage used in the analog front end functions of modem chip 152.

The OR, AND, and NOR gates labeled U7, U8, and U9 respectively and shown in FIGS. 3b and 3c are used in address decoding and memory bank swapping. Since the CPU 144 can directly address only 64K of memory, and substantial excess memory is used in the system, a memory bank swapping scheme is necessary for proper system operation.

Figure 4:
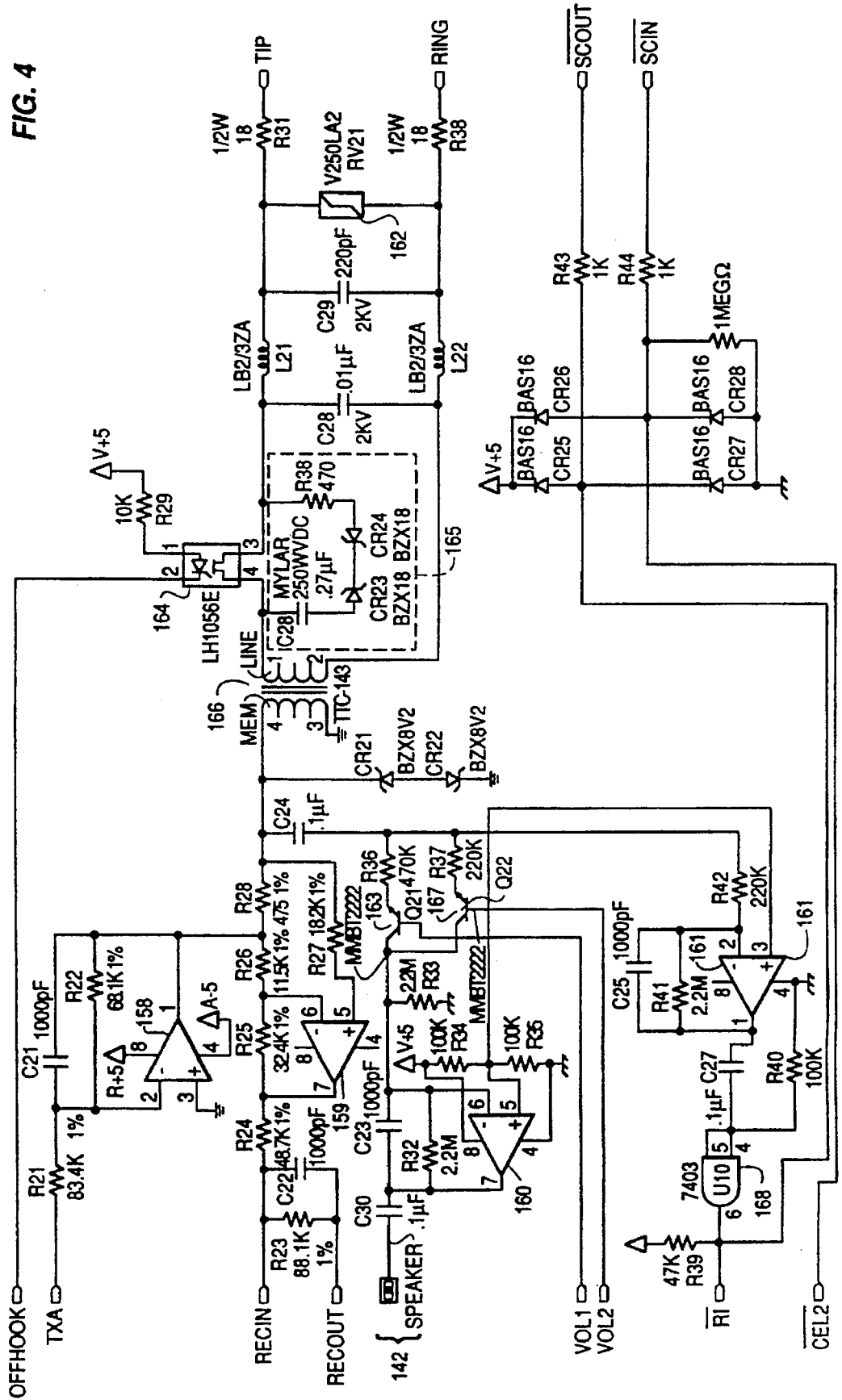
FIG. 4 is a schematic diagram of a preferred embodiment of the Data Access Arrangement section of the cellular data modem of the present invention.

Referring now to FIG. 4, the DAA section 118 of the modem 102 is shown in detail. DAA section 118 includes operational amplifiers 158, 159, 160, and 161, varistor 162, isolated FET switch 164, bypass network 165, isolation transformer 166, NAND gate 168, and resistance switching transistors 163 and 167. Exemplary model numbers and manufacturers for major components are shown in Table D. In addition, DAA section 118 includes numerous resistors, capacitors, and diodes with values as indicated in FIG. 4.

The transistors shown in FIGS. 3d and 4 may be 2N2222 transistors manufactured by Motorola.

The DAA section 118 provides isolation and interfacing circuitry for connecting the CPU/modem section 114 to the analog TIP and RING lines. In addition, the DAA section 118 provides appropriate pullup, pulldown, and protective circuitry for the SCIN and SCOUT lines. The SCOUT and SCIN terminals of the modem 102 are open collector. A logic "1" is represented by ground, and a "0" is represented by Vcc, which is 5 volts DC. The DAA section 118 provides a pullup for the SCOUT terminal to hold it at a logic "0" unless it is driven by the signal processing cable 100. As will be seen, the signal processing cable 100 includes a 47 kOhm pullup resistor connected between its SCIN terminal and Vcc to hold the SCIN terminal at a logic "0" unless the line is driven by the modem 102.

The isolation transformer 166 provides FCC part 68 protection for the circuit. The isolated FET switch 164 responds to the OFFHOOK signal to take the modem 102 on and off hook. The bypass network 165 provides snubbing and allows ring voltage to be transmitted at an attenuated level to the CPU/modem section 114 even when the isolated FET switch 164 is open (on hook).

The operational amplifiers 158 and 159 are preferably contained in a single monolithic device. Similarly, the operational amplifiers 160 and 161 may be contained in a single device. Operational amplifier 161, with its associated circuitry, senses ring voltage from the tip and ring lines and selectively produces a ring indication signal RI. Operational amplifier 158 is a transmission signal amplifier. The capacitor C21 and resistor R22 associated with operational amplifier 158 provide high frequency filtering of the transmission signal. The operational amplifier 159 is an input signal amplifier stage and summer. Operational amplifier 159 acts to separate the output signal from the total TIP and RING signals so that the input signal can be passed to CPU/modem section 114.

The operational amplifier 160 acts as a volume controlled speaker amplifier. The resistance switching transistors 163 and 167 respond to the VOL1 and VOL2 signals generated by CPU/modem section 114 to connect either a 470K Ohm resistor, a 220K Ohm resistor, or both these resistors in parallel between the speaker signal and the speaker. Thus, four possible volume levels corresponding to the digital level permutations of VOL1 and VOL2 are possible.

While the schematic diagrams of FIGS. 3a through 3e and 4 show a system designed to interface with a Zenith Supersport computer, those skilled in the art will recognize that the modem 102 of the present invention could be readily adapted for installation in other types and brands of portable computers and other computing devices in general.

Figure 5:
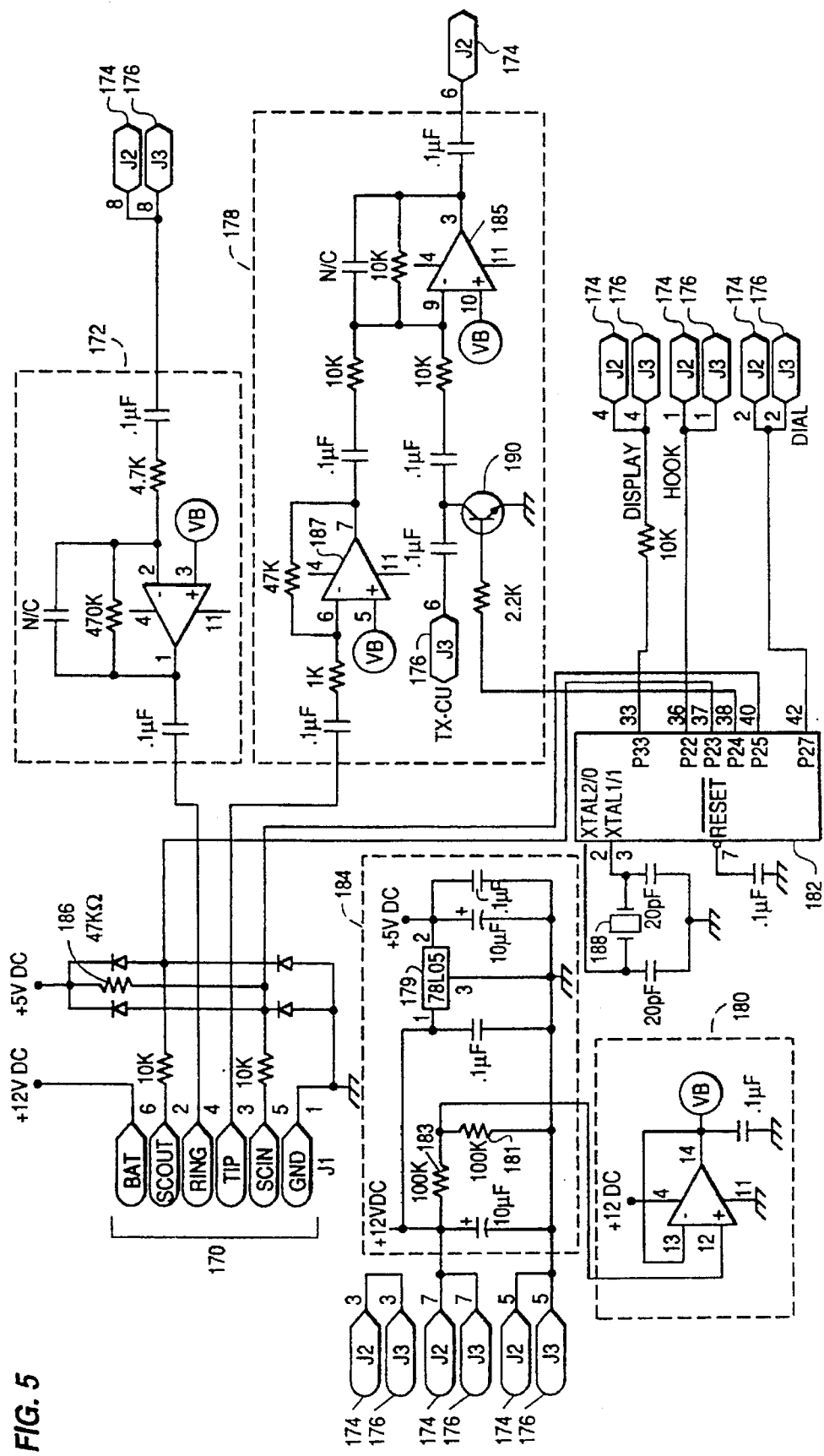
FIG. 5 is a schematic diagram of a signal processing cable according to the present invention.

A preferred embodiment of the signal processing cable 100 is shown in FIG. 5. The signal processing cable shown in FIG. 5 is designed to operate with the modem 102 shown in FIGS. 3 and 4 and with a Fujitsu Commander cellular telephone. Of course, those skilled in the art can readily construct signal processing cables in accordance with the present invention to operate with other brands and models of cellular telephones. It is a particular advantage of the present scheme for connecting computers to cellular and landline telephone networks that the signal processing cables are relatively simple and low in cost. As new cellular telephone models and brands are introduced, the design shown in FIG. 5 or a similar design can be adapted for use with these other telephones through simple wiring, connector, and software modifications. The functions and connections of the cellular bus lines in the Fujitsu Commander telephone are described in the "Fujitsu Commander Cellular Mobile Telephone Installation and Maintenance Manual," available from Fujitsu America, Inc., Richardson, Tex., which is incorporated herein by reference.

Referring now to FIG. 5, the sisal processing cable 100 includes an RJ-11 connector 170 (also labeled J1), ring interface section 172, tip interface section 178, cellular bus connectors 174 and 176 (also labeled J2 and J3 respectively), bias voltage section 180, microcontroller 182, and power supply section 184.

The signal processing cable 100 includes numerous resistors and capacitors which have the values shown in the diagram. The capacitors marked N/C (for "No Connect") are optional filtering capacitors. If included in the circuit, these capacitors may take on any desired value appropriate for filtering unwanted signals. The signal processing cable 100 also includes transistor 190, which may be a Motorola 2N2222 transistor. The diodes shown in FIG. 5 may be 1N914 diodes manufactured by Motorola.

The RJ-11 connector 170 is mounted on the end of a modular telephone wire of appropriate length and is adapted to connect to the RJ-11 connector 140 of modem 102 (as shown in FIG. 2a).

The cellular bus connectors 174 and 176 are RJ-45 connectors as manufactured by Amphenol, and are mounted on wires of appropriate length for connection to the cellular transceiver 110 and control unit 108. Rather than connecting to the cellular bus 112 using a three-way connector as shown in FIG. 2a, which would merely connect all the equivalent lines of the three cables, this preferred embodiment of the invention provides two cables at the cellular telephone side of signal processing cable 100. One of these cables, terminating in cellular bus connector 174, is connected to cellular transceiver 110. The other cable, terminating in cellular bus connector 176, is connected to cellular control unit 108. Thus, the cellular bus 112 passes through the signal processing cable 100. This embodiment is preferred because the number of connections and wires required is reduced and because this arrangment allows the signal processing cable to selectively block signals transmitted on cellular bus 112 by control unit 108 or transceiver 110 as well as injecting signals into the cellular bus 112.

The microcontroller may be a Zilog Z8 PLCC surface mount microcontroller, model Z86C08 which includes a microprocessor, RAM, input/output ports, and a mask-programmed ROM program memory. The program memory of the microcontroller 182 will be masked to contain a program implementing the functions of the signal processing cable 100 which have been described herein. The source code for this program may be as shown in Appendix A. The microcontroller 182 is provided with a crystal 188 which may be a 3.6864 Mhz crystal.

The power supply section 184 includes a 5 V DC power supply regulator 179, which may be a 78L05, and various filter capacitors as shown in the drawing. The voltage divider resistors 181 and 183 are connected between 12 V DC and ground, so that a voltage of approximately 6 V DC is produced at the connection of voltage divider resistor 181 to voltage divider resistor 183.

The four operational amplifiers shown in ring interface section 172, tip interface section 178, and interface section 180 are preferably contained in a monolithic TL074 integrated circuit manufactured by Texas Instruments. Pin numbers for the connections to this circuit are indicated in FIG. 5. The operational amplifiers operate with a bias voltage VB generated by the bias voltage section 180 from the 6 V DC voltage provided at the common terminal of the two 100K Ohm voltage divider resistors 181 and 183 of power supply section 184. The connection of pins of the operational amplifier circuit to the circles designated VB (pins 3, 5, 10, and 14) indicates an electrical connection between these pins, although the lines for these connections have been omitted from FIG. 5 for clarity.

The ring interface section 172 provides level and impedance matching for the RING line to make the RX signal of the Fujitsu cellular transceiver compatible with the RING analog terminal of modem 102. Similarly, the operational amplifier 187 of ring interface section 172 provides impedance and level matching for the TIP line to make the TIP signals of the modem 102 and the TX signal of the Fujitsu cellular transceiver compatible.

Tip interface section 174 further includes a summing operational amplifier 185 which sums the tip signals and the signals produced by the microphone of cellular control unit 108. Tip interface section 174 also includes a switching transistor 190. The base of switching transistor 190 is connected through a resistor to the P25 terminal (pin 40) of the microcontroller 182. By controlling the output of its P25 terminal, the microcontroller 182 can selectively ground the line connected to the collector of the switching transistor 190 to selectively inhibit or permit the transmission of signals from the cellular control unit microphone (which is connected to pin 6 of cellular bus connector 176) to cellular bus connector 174.

The microcontroller 182 is connected by its P22 terminal input/output port (pin 36) to the Hook lines of the cellular bus 112. The microcontroller 182 can thus selectively control the voltage on the Hook lines of cellular bus 112. Similarly, the P27 terminal (pin 42) of the microcontroller 182 is connected to the dial lines of the cellular bus 112. The microcontroller 182 can therefore selectively control the voltage on the dial lines of cellular bus 112 by varying the signal from the P27 terminal to the dial lines.

In another embodiment of the signal processing cable 100, the signal processing cable 100 may be designed to operate with more than one type of cellular bus. Multiple-bus compatibility would be particularly desirable where several types of cellular busses use the same connectors and use relatively similar signalling lines within their busses. The masked ROM of the microcontroller 182 provides enough memory capacity to store operating information for several types of cellular busses. Other than the additional operating software required, all that is required to produce a signal processing cable 100 compatible with a plurality of types of cellular busses is to provide an input signal specifying the type of bus. In the simplest embodiment, this input signal could be one or more DIP switches, jumper lines, or switches mounted on the exterior of the circuit casing of signal processing cable 100 and connected to an input of microcontroller 182. These switches or jumpers would be adjusted by the end user to define the type of cellular bus 112 connected to signal processing cable 100, and the program of microcontroller 182 would respond to these switch or jumper signals to select appropriate protocols or appropriate transmission lines of the cellular bus 112 to be used. In another embodiment of the multiple-bus compatible signal processing cable, input ports of the microcontroller 182 may be connected to lines of the cellular bus 112 and the microcontroller 182 is programmed to sense signals on the lines of the cellular bus 112 to identify the configuration of the cellular bus 112. The program of microcontroller 182 would then select appropriate protocols and lines for transmission of signals to and reception of signals from the particular type of cellular bus 112.

While the multiple-bus embodiment of the signal interface cable 100 has been described in terms of cellular busses that use similar connectors, it would also be possible to design such a multiple-bus cable to be compatible with a plurality of busses using dissimilar connectors. In this embodiment, the signal processing cable 100 would be provided with a plurality of cables for connecting to the cellular bus 112 or for connecting to the cellular control unit 108 and the cellular transceiver 110, and the user would select the cables to be connected or would select from among plug adapters provided for adaptation of the cables to dissimilar connection systems.

The SCIN line, pin 2 of the RJ-11 connector 170, is connected to +5 volts DC by pullup resistor 186, which is a 47 kOhm resistor.

The command and codes and responses will be transmitted between the modem 102 and signal processing cable 100 over SCIN and SCOUT, as appropriate, at a speed of 4800, 2400, 1200, or 300 bits per second. The speed of transmission will be determined by the maximum speed capability of the signal processing cable 100, which will be communicated to the modem 102 during the wakeup sequence, which was explained in detail previously. The signal processing cable 100 is preferably designed to have the lowest cost components and lowest power consumption consistent with its mission of communicating with the cellular telephone bus 112. Thus, although the signal processing cable 100 could be designed to operate at much higher speeds, in the interests of reducing cost and power consumption, speeds of 4800 baud or less are preferred.

In general, additional forms of signal limiting protection, as are well-known in the art, may be included in the system to minimize the possibility of damage to the circuits of the present invention by transmission of high voltage or current signals through the various information transfer line connections. To the extent possible, in order to minimize the cost of the signal processing cable 100, any additional desired signal limiting protection for information transfer terminals will preferably be provided within modem 102 rather than in signal processing cable 100.

Each byte of data is preferably sent as eight bits, with one start bit (logic "1" or ground) and two stop bits, for a total of 11 bits per word sent. As a particular feature of the invention, each byte sent will be repeated three times, allowing for majority decoding. The bits are repeated without the insertion of additional stop bits, so that one byte of data can be sent as 33 bits presented serially in 33 bit times.

Exceptions to this method of data transmission on the SCIN and SCOUT lines occur during the wakeup sequence and the alert sequence, as described previously.

STATEMENT OF INDUSTRIAL APPLICABILITY

Broadly, the present invention relates to the field of digital data transmission systems. More specifically, the present invention is an integrated modem and interfacing system that permits connection of a single cellular-capable modem to a variety of cellular transceivers or to a landline telephone jack.

I claim:

1. A method for interfacing a computing device to one of a plurality of connectable access devices of one of two or more types of telephone networks, including a first network responding to analog dialing signals and a second network having digital dialing signals, comprising the steps of:

(a) providing first and second signal paths at an interface connector of the computing device;

(b) connecting said interface connector of the computing device to an interface connector of the access device;

(c) determining whether the network accessable through said access device responds to analog or digital dialing signals;

(d) if the network responds to analog dialing signals, transmitting analog dialing signals and data signals on the first signal path;

(e) if the network responds to digital dialing signals, transmitting digital dialing signals on the second signal path.

2. The method of claim 1 wherein in step (a) the interface connector is provided in a modem associated with the computing device.

3. The method of claim 1 wherein the analog dialing signals transmitted in step (d) are DTMF tones.

4. The method of claim 3 wherein the first signal path comprises a tip-and-ring interface.

5. The method of claim 1 wherein the first network is a landline telephone network and the second network is a radio communications network.

6. The method of claim 5 wherein the second network is an AMPS standard cellular radiotelephone network.

7. The method of claim 1 wherein the first and second signal paths are provided in the same interface connector.

8. The method of claim 7 wherein the interface connector carrying the first and second signal paths is a standard landline telephone connector.

9. A method for connecting a portable personal data processing device to one of a plurality of access devices for a radio communications network to achieve transfer of data with a remote station, comprising the steps of:

providing the data processing device with an interface circuit for transferring information between the access device and the portable personal data processing device;

storing in the interface circuit at least one of a plurality of possible program data sets defining digital control signals for at least one type of radio communications network access device, according to a standard protocol of such access device, and defining predetermined line connections over which said signals are to be transmitted;

connecting the interface circuit to a specified one of said access devices using a cable that establishes said predetermined line connections to the access device defined by the program data set;

transmitting digital operational commands from the portable personal data processing device and receiving by the interface circuit;

using the interface circuit, automatically retrieving a program data set compatible with the access device connected to said cable means, generating addressing signals to initiate data transfer with the remote station using said access device and said radio communications network, and transferring data between the data processing device and the remote station.

10. The method of claim 9 wherein said communication network is a cellular radiotelephone network, and said access device is a cellular radiotelephone.

11. The method of claim 9 wherein the interface circuit includes a circuit for receiving a user input specifying a type of radio access device to be used, and the step of automatically retrieving a program data set is performed to retrieve a program data set relating to the particular radio access device specified by said user input.

12. The method of claim 9 wherein the interface circuit includes a modem circuit for modulating and demodulating data transferred between said portable personal data processing device and the remote station.

13. The method of claim 9 wherein said interface circuit comprises a standardized connector mating with a corresponding connector in the portable personal data processing device to operably connect the interface circuit for data transfer with the portable personal data processing device.

14. The method of claim 13 wherein said standardized connector is a card slot connector.

15. The method of claim 14 wherein said standardized card slot connector provides a standardized computer bus interface to the data processing device.

16. The method of claim 9 where said portable personal data processing device is a personal computing device.

17. The method of claim 9 where the interface circuit has at least one separable connector which receives one of a plurality of said cables, each said cable associated with a specific type of access device and having a plurality of lines extending between a connector compatible with said separable connector and a connector compatible with said specific type of access device.

18. The method of claim 17 wherein a program data set is associated with each said cable so that the interface circuit transmits information to initiate a radio transmission, according to a standard protocol of the access device in conjunction with said predetermined line connections established by said cable.

19. The method of claim 18 wherein a plurality of said program data sets are simultaneously available in said interface circuit.

20. The method of claim 9 wherein said line connections include at least one data line for transmitting and receiving data and at least one control signal line separate from the data line for controlling addressing and operation of the access device.

21. The method of claim 20 wherein the transmissions of said control signal lines vary according to the program data set retrieved by the interface circuit.

22. The method of claim 21 wherein said line connections include a receive data line and a transmit data line forming a receive and transmit interface with the access device.

23. A method for connecting a portable personal data processing device to an access device for a radio communications network to achieve data transfer with a remote station, comprising the steps of:

providing an interface circuit comprising an access-device-specific operating combination, including (1) a cable for establishing predetermined line connections to a specified one of said access devices in said radio communications network to control address specification and data transmission functions of the access device, the cable having a connector compatible with a connector of the access device, and (2) a program data set defining digital control signals for the access device in conjunction with said predetermined line connections;

connecting the portable personal data processing device to the access device for the radio communications network using the interface circuit so that the interface circuit processes and transmits information between the portable personal data processing device and the radio communications network;

transmitting a digital command from the portable personal data processing device and receiving by the interface circuit which causes the interface circuit to retrieve the program data set and generate addressing signals to initiate data transfer with the remote station using said access device and said radio communications network.

24. The method of claim 23 wherein said radio communications network is a cellular radiotelephone network, and said access device is a cellular radiotelephone.

25. The method of claim 23 wherein the interface circuit includes a circuit for receiving a user input specifying a type of radio access device to be used, and the step of retrieving a program data set is performed automatically to retrieve a program data set relating to the particular radio access device specified by said user input.

26. The method of claim 23 wherein the interface circuit includes a modem circuit for modulating and demodulating data transferred between said portable personal data processing device and the remote station.

27. The method of claim 23 wherein said interface circuit comprises a standardized connector mating with a corresponding connector in the portable personal data processing device to operably connect the interface circuit for data transfer with the portable personal data processing device.

28. The method of claim 27 wherein said standardized connector is a card slot connector.

29. The method of claim 28 wherein said standardized card slot connector provides a standardized computer bus interface to the data processing device.

30. The method of claim 23 where said portable personal data processing device is a personal computing device.

31. The method of claim 23 where the interface circuit has at least one separable connector which receives one of a plurality of said cables, each said cable associated with a specific type of access device and having a plurality of lines extending between a connector compatible with said separable connector and a connector compatible with said specific type of access device.

32. The method of claim 31 wherein a program data set is associated with each said cable so that the interface circuit transmits information to initiate a radio transmission, according to a standard protocol of the access device in conjunction with said predetermined line connections established by said cable.

33. The method of claim 32 wherein a plurality of said program data sets are simultaneously available in said interface circuit.

34. The method of claim 23 wherein said line connections include at least one data line for transmitting and receiving data and at least one control signal line separate from the data line for controlling addressing and operation of the access device.

35. The method of claim 34 wherein the transmissions of said control signal lines vary according to the program data set retrieved by the interface circuit.

36. A method of connecting a portable personal data processing device to one of a plurality of public communications networks, including at least one public radio network, to achieve transfer of data with a remote station, comprising the steps of:

providing a portable public communications network interface circuit which provides connections to a plurality of public communications networks, the network interface including a radio transceiving device which selectively transmits and receives data on a plurality of radio channels using one of a plurality of standardized operating protocols;

storing in the interface circuit a plurality of possible program data sets, each data set defining a different operating protocol for establishing data transfer communications with one of the plurality of public communications networks according to a standard communications protocol of that network;

connecting the interface circuit to the portable personal data processing device;

transmitting operational commands from the portable personal data processing device to the interface circuit specifying which one of the public communications networks should be used for data transmission;

using the interface circuit, automatically retrieving a program data set compatible with the selected public communications network, activating the protocol corresponding to the selected network, and generating addressing signals to initiate data transfer with the remote station using the selected public communications network and protocol, and transferring data between the data processing device and the remote station.

37. The method of claim 36 wherein, in the step of transmitting operational commands from the portable personal data processing device to the interface circuit, the operational commands are generated according to a standardized command language.

* * * * *